(12) United States Patent
Hara

(10) Patent No.: US 10,034,210 B2
(45) Date of Patent: Jul. 24, 2018

(54) MOBILE COMMUNICATION DEVICE AND WIRELESS COMMUNICATION METHOD

(71) Applicant: FUJITSU LIMITED, Kawasaki-shi, Kanagawa (JP)

(72) Inventor: Yasushi Hara, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 15/018,905

(22) Filed: Feb. 9, 2016

(65) Prior Publication Data

US 2016/0262067 A1 Sep. 8, 2016

(30) Foreign Application Priority Data

Mar. 2, 2015 (JP) ................... 2015-040436

(51) Int. Cl.
| | |
|---|---|
| H04Q 7/00 | (2006.01) |
| H04W 36/10 | (2009.01) |
| H04W 36/30 | (2009.01) |
| H04W 36/36 | (2009.01) |
| H04W 36/00 | (2009.01) |
| H04W 84/12 | (2009.01) |

(52) U.S. Cl.
CPC ....... *H04W 36/10* (2013.01); *H04W 36/0088* (2013.01); *H04W 36/30* (2013.01); *H04W 36/36* (2013.01); *H04W 84/12* (2013.01)

(58) Field of Classification Search
CPC . H04W 36/10; H04W 36/0088; H04W 36/36; H04W 36/30; H04W 84/12
USPC .......................... 370/331, 252, 254
See application file for complete search history.

(56) References Cited

U.S. PATENT DOCUMENTS

| | | | | |
|---|---|---|---|---|
| 8,422,471 B2* | 4/2013 | Kurose | ............... | H04M 1/7253 370/338 |
| 8,699,379 B2* | 4/2014 | Kholaif | ................ | H04W 48/20 370/254 |
| 8,811,349 B2* | 8/2014 | Deshpande | ........... | H04W 48/16 370/332 |
| 2008/0064404 A1 | 3/2008 | Zhang et al. | | |
| 2008/0198811 A1* | 8/2008 | Deshpande | ........... | H04W 48/16 370/332 |
| 2009/0119751 A1 | 5/2009 | Koga | | |
| 2010/0008285 A1* | 1/2010 | Kuroda | ............. | H04W 36/0055 370/315 |
| 2010/0246529 A1 | 9/2010 | Ishizu et al. | | |
| 2011/0222516 A1* | 9/2011 | Kurose | ............... | H04M 1/7253 370/338 |

(Continued)

FOREIGN PATENT DOCUMENTS

| | | |
|---|---|---|
| JP | 2003-264565 A | 9/2003 |
| JP | 2005-175932 A | 6/2005 |

(Continued)

*Primary Examiner* — Chuong T Ho
(74) *Attorney, Agent, or Firm* — Fujitsu Patent Center

(57) ABSTRACT

A mobile communication device includes a wireless communication interface and a processor. The wireless communication interface runs a first scan for searching for one or more access points. The processor determines whether, by the first scan, a plurality of access points with the same identification information have been detected on different channels. Based on results of the determination, the processor alters the method of a second scan to be run after a connection to an access point.

11 Claims, 31 Drawing Sheets

(56) References Cited

U.S. PATENT DOCUMENTS

| | | | |
|---|---|---|---|
| 2011/0243013 A1* | 10/2011 | Lee | H04W 24/10 |
| | | | 370/252 |
| 2011/0294504 A1* | 12/2011 | Hara | H04W 48/16 |
| | | | 455/434 |
| 2012/0076117 A1 | 3/2012 | Montemurro et al. | |
| 2012/0257536 A1* | 10/2012 | Kholaif | H04W 48/20 |
| | | | 370/254 |
| 2016/0212695 A1* | 7/2016 | Lynch | H04W 48/08 |

FOREIGN PATENT DOCUMENTS

| | | |
|---|---|---|
| JP | 2008-079305 A | 4/2008 |
| JP | 2008-278313 A | 11/2008 |
| JP | 2010-081118 A | 4/2010 |
| JP | 2011-004225 A | 1/2011 |
| JP | 2011-250342 A | 12/2011 |
| JP | 2013-539307 A | 10/2013 |
| WO | 2008/004279 A1 | 1/2008 |
| WO | 2012/041532 A1 | 4/2012 |

\* cited by examiner

STORING UNIT

OPTION CH TABLE 113

| ESSID | BSSID | CHANNEL | OPTION CHANNEL | OUTDOOR FLAG |
|---|---|---|---|---|
| ESSID_00 | BSSID_01 | CH1 | CH6, CH44 | 0 |
| ESSID_00 | BSSID_02 | CH6 | CH1, CH44 | 0 |
| ESSID_00 | BSSID_03 | CH44 | CH1, CH6 | 0 |

MOBILE COMMUNICATION DEVICE AND WIRELESS COMMUNICATION METHOD

CROSS-REFERENCE TO RELATED APPLICATION

This application is based upon and claims the benefit of priority of the prior Japanese Patent Application No. 2015-040436, filed on Mar. 2, 2015, the entire contents of which are incorporated herein by reference.

FIELD

The embodiments discussed herein are related to a mobile communication device and a wireless communication method.

BACKGROUND

Wireless Local Area Network (WLAN)-enabled mobile communication devices are in use today. In a WLAN, access points (sometimes also called "base stations") with wireless interfaces are scattered. Each mobile communication device runs a search (or a scan), for example, to see if there is an available access point located nearby. If detecting an access point meeting a predetermined condition and having received signal strength equal to or greater than a connection threshold, the mobile communication device connects to the access point automatically or according to an instruction from the user to thereby perform wireless communication.

In an area where a plurality of access points are densely deployed, a mobile communication device may be able to perform a handover from one to another among the access points as the mobile communication device moves. For example, there has been proposed a handover scheme in which, when the received signal strength of a currently connected access point becomes low, a mobile communication device performs data communication and a scan for neighboring access points in parallel by time division and, then, performs a handover to a different access point with higher received signal strength.

In addition, there has been proposed a wireless communication system for reducing power consumption of a mobile communication device by shortening the time for scanning in the case where the mobile communication device performs a handover. According to the wireless communication system, when having performed a scan, the mobile communication device records simultaneous detection information indicating a plurality of access points detected by the scan at the same time. Later when being connected to an access point, the mobile communication device skips a scan for neighboring access points by extracting, from the simultaneous detection information, handover destination options likely to be detected simultaneously with the currently connected access point.

Further, there has been proposed a mobile communication device enabling voice calls and data communication via a WLAN. The mobile communication device stores in advance a profile associating identification information of each access point and a type indicating whether the access point supports voice calls. Based on the profile, the mobile communication device determines whether each of neighboring access points supports voice calls, and sets the scan time for access points supporting voice calls longer than that for access points not supporting voice calls.

See, for example, Japanese Laid-open Patent Publication Nos. 2005-175932, 2010-81118, and 2011-250342.

Note here that, around an access point, there may or may not be another access point to which a handover is possible from the access point. In shopping malls and large offices, for example, it is sometimes the case that a plurality of access points are densely deployed by the same installer so as to cover a large area with a WLAN. Each of such a plurality of access points is usually connectable from the same mobile communication device, and handovers among the access points are allowed in general. On the other hand, in private residences and small retail premises, for example, an installer may install only a single access point because only a specific small area needs to be covered with a WLAN. Around such a singularly installed access point, no other access point may be present. Even if a different access point exists, it is often the case that the same mobile communication device is not allowed to connect to the access point and thus a handover is not possible.

Therefore, if the mobile communication device initiates a scanning operation in preparation for a handover on a continuous basis, the scanning operation ends up being wasted when a different access point to which a handover is possible does not exist in its neighboring area, thus putting more load on the mobile communication device. For example, as described in Japanese Laid-open Patent Publication No. 2005-175932, continuing search for neighboring handover destinations while being connected to an access point results in high power consumption of the mobile communication device. In addition, performing data communication and a search for handover destinations in parallel by time division may lead to decreased quality of the data communication.

SUMMARY

According to an aspect, there is provided a mobile communication device including a wireless communication interface configured to run a first scan for searching for one or more access points; and a processor configured to perform a procedure including determining whether, by the first scan, a plurality of access points with the same identification information have been detected on different channels, and altering, based on results of the determining, a method of a second scan to be run after a connection to an access point.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of an option channel table;

DESCRIPTION OF EMBODIMENTS

Figure 1:
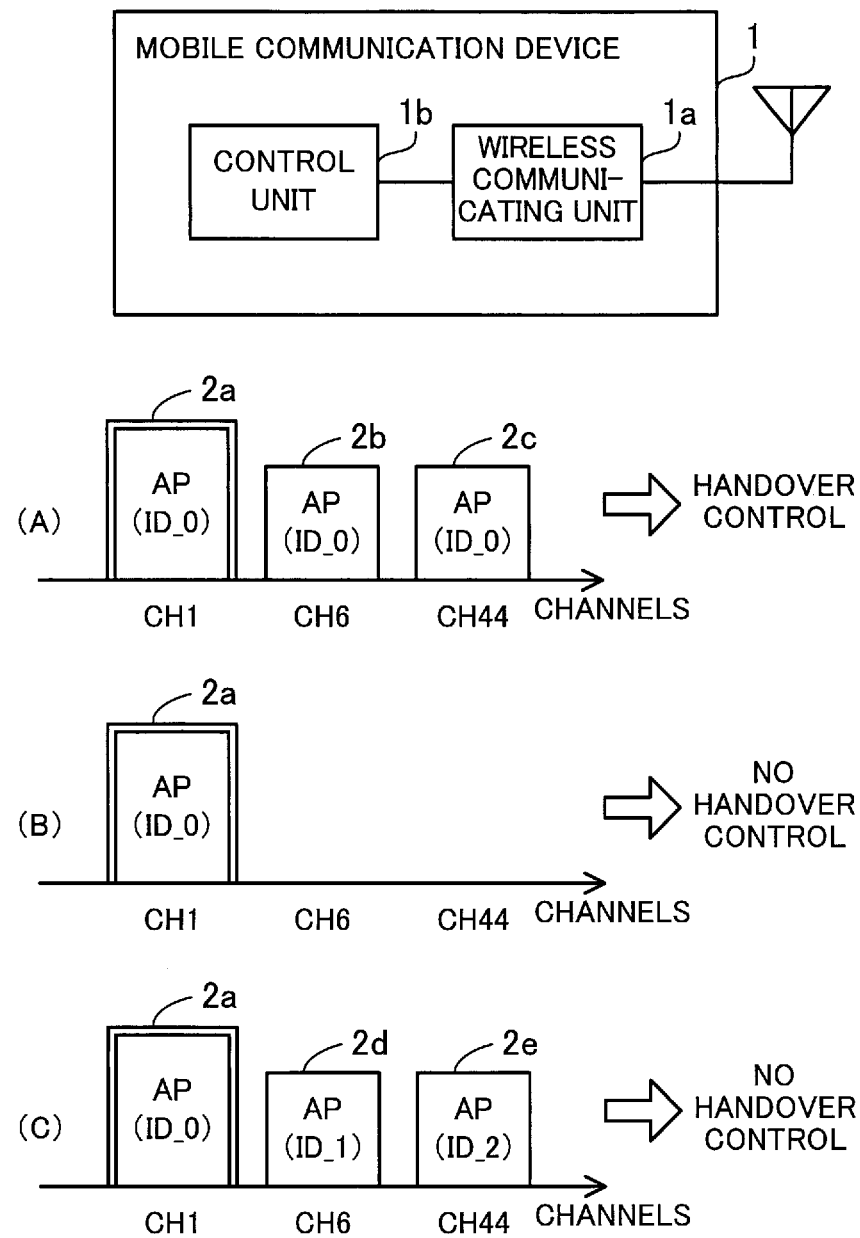
FIG. 1 illustrates a mobile communication device according to a first embodiment.

Several embodiments will be described below with reference to the accompanying drawings, wherein like reference numerals refer to like elements throughout.

(a) First Embodiment

FIG. 1 illustrates a mobile communication device according to a first embodiment. A mobile communication device 1 of the first embodiment communicates wirelessly by connecting to one of access points 2a, 2b, 2c, 2d, and 2e. The mobile communication device 1 is, for example, a mobile wireless terminal such as a mobile phone, a smartphone, a personal digital assistant (PDA), a tablet terminal, or a notebook personal computer (PC). The access points 2a, 2b, 2c, 2d, and 2e are, for example, wireless communication devices belonging to a WLAN, and sometimes referred to as the "base stations". Each of the access points 2a, 2b, 2c, 2d, and 2e is provided with a wireless interface for communicating with the mobile communication device 1 and a wired or another wireless interface for communicating with a superior network, and relays data of the mobile communication device 1.

The access point 2a uses a channel CH1 for its wireless communication. The access point 2b uses a channel CH6 for its wireless communication. The access point 2c uses a channel CH44 for its wireless communication. The access point 2d uses the channel CH6 for its wireless communication. The access point 2e uses the channel CH44 for its wireless communication. The access points 2a, 2b, and 2c are individually assigned identification information of "ID_0". The access point 2d is assigned identification information of "ID_1". The access point 2e is assigned identification information of "ID_2". Each of the access points 2a, 2b, 2c, 2d, and 2e transmits wirelessly its identification information.

The identification information is a name assignable redundantly to a plurality of access points. An example of such is an extended service set identifier (ESSID). It is sometimes the case that the same identification information is assigned to a plurality of access points installed by the same installer (for example, the same business operator). For example, in a large area such as a shopping mall or an office, a plurality of access points assigned the same identification information may be densely deployed by the same business operator. In this case, handovers among the access points are possible.

The mobile communication device 1 includes a wireless communicating unit 1a and a control unit 1b. The wireless communicating unit 1a is a wireless interface capable of wirelessly communicating with the access points 2a, 2b, 2c, 2d, and 2e. According to an instruction from the control unit 1b, the wireless communicating unit 1a runs a scan to search for access points. In the scan, the wireless communicating unit 1a extracts identification information transmitted by each of detected access points. In addition, the wireless communicating unit 1a measures the strength of a signal received from each of the detected access points. The received signal strength is represented by an index value, for example, the Received Signal Strength Indicator (RSSI).

The control unit 1b controls wireless communication of the wireless communicating unit 1a. The control unit 1b may include a processor, such as a central processing unit (CPU) or a digital signal processor (DSP). In addition, the control unit 1b may include an electronic circuit designed for specific use, such as an application specific integrated circuit (ASIC) or a field programmable gate array (FPGA). The processor executes a communication control program stored in a storage device, such as random access memory (RAM) or flash memory. The term "processor" here includes a set of multiple processors (i.e., multiprocessor).

First, the control unit 1b causes the wireless communication unit 1a to run a "first scan". The first scan is run, for example, when the mobile communication device 1 is not connected to any access point. In addition, the first scan is run, for example, during the period from when a normal scan for determining a destination access point is run to when a connection is made to the determined access point. Assume here that, by the first scan or the normal scan run prior to the first scan, the control unit 1b has determined to connect to the access point 2a. The destination access point is one selected amongst the detected access points, to which the mobile communication device 1 is allowed to connect and which has the highest received signal strength.

Next, the control unit 1b determines whether, by the first scan, a plurality of access points assigned the same identification information have been detected on different channels. The "different channels" here means, for example, two or more channels belonging to the same frequency band. Examples of WLAN frequency bands include the 2.4 GHz band and the 5 GHz band. Note however that the control unit 1b may determine whether three or more access points assigned the same identification information have been detected on different channels. Then, according to whether a plurality of access points satisfying the above condition have been detected, the control unit 1b determines whether a handover is possible at the current location. That is, if a plurality of access points satisfying the above condition have been detected, a handover is determined to be possible. If not, a handover is determined to be not possible.

Then, depending on the determination result regarding the handover possibility, the control unit 1b alters the way of a "second scan" to be run after connecting to the access point 2a. For example, when having determined that a handover is possible, the control unit 1b causes the wireless communicating unit 1a to run the second scan during the mobile communication device 1 being connected to the access point 2a in order to search for a handover destination. In this case, the second scan is started, for example, when the received signal strength has dropped to or below a predetermined threshold, which is higher than a connection threshold used to determine whether a connection to the access point 2a is possible. On the other hand, when having determined that a handover is not possible, the control unit 1b causes the wireless communication unit 1a to run an out-of-range scan as the second scan after the mobile communication device 1 has moved outside the range of the access point 2a. In addition, when having determined that a handover is possible, for example, the control unit 1b sets the cycle of the second scan shorter than when having determined that a handover is not possible.

Thus, when a plurality of access points assigned the same identification information have been detected on different channels by the first scan, the control unit 1b controls the second scan in such a manner as to facilitate a smooth handover. On the other hand, when no access point satisfying the above condition has been detected by the first scan, the control unit 1b need not give consideration to a handover.

Assume for example that, by the first scan, the access point 2a is detected on the channel CH1; the access point 2b is detected on the channel CH6; and the access point 2c is detected on the channel CH44 ((A) in FIG. 1). The access points 2a and 2b are detected on different channels in the same frequency band, and the access points 2a, 2b, and 2c have the same identification information. In this case, it is likely that the access points 2a, 2b, and 2c have been installed by the same business operator and configured in such a manner that a handover from one access point to another is possible. Therefore, a handover at the current location is determined to be possible, and the second scan is run in consideration of a handover.

Assume for example that, by the first scan, the access point 2a is detected on the channel CH1, and no other access points are detected ((B) in FIG. 1). In this case, a handover at the current location is determined to be impossible, and the second scan is run without consideration of a handover. Assume the case that the access point 2d using the channel CH6 and the access point 2e using the channel CH44 exist around the access point 2a ((C) in FIG. 1). The identification information of each of the access points 2d and 2e is different from that of the access point 2a. In this case, the access point 2a is likely to be not associated with the access points 2d and 2e and have been installed singularly. Therefore, a handover at the current location is determined to be impossible, and the second scan is run without consideration of a handover.

Note that the control unit 1b may limit access points to be detected by the first scan to those with the same identification information ("ID 0") as the access point 2a to which a connection is to be made. In addition, when having determined by the first scan that a handover is possible, the control unit 1b may limit access points to be detected by the second scan to those with the same identification information ("ID 0") as the connected access point 2a. Further, when having determined by the first scan that a handover is possible, the control unit 1b may run, in the second scan, a search preferentially on channels where access points were detected by the first scan.

According to the mobile communication device 1 of the first embodiment, whether the current location is a place where a handover is possible is determined based on if, by the first scan, a plurality of access points assigned the same identification information have been detected on different channels. Subsequently, depending on the determination result, how to run the second scan after a connection is made to the access point 2a is altered. Herewith, it is possible to control excessive scanning operations when a different access point to which a handover is possible from the access point 2a does not exist around the access point 2a. This reduces the power consumption of the mobile communication device 1. In addition, it is possible to prevent a handover scanning operation from interrupting data communication with the access point 2a, thus improving the quality of the data communication.

(b) Second Embodiment

Figure 2:
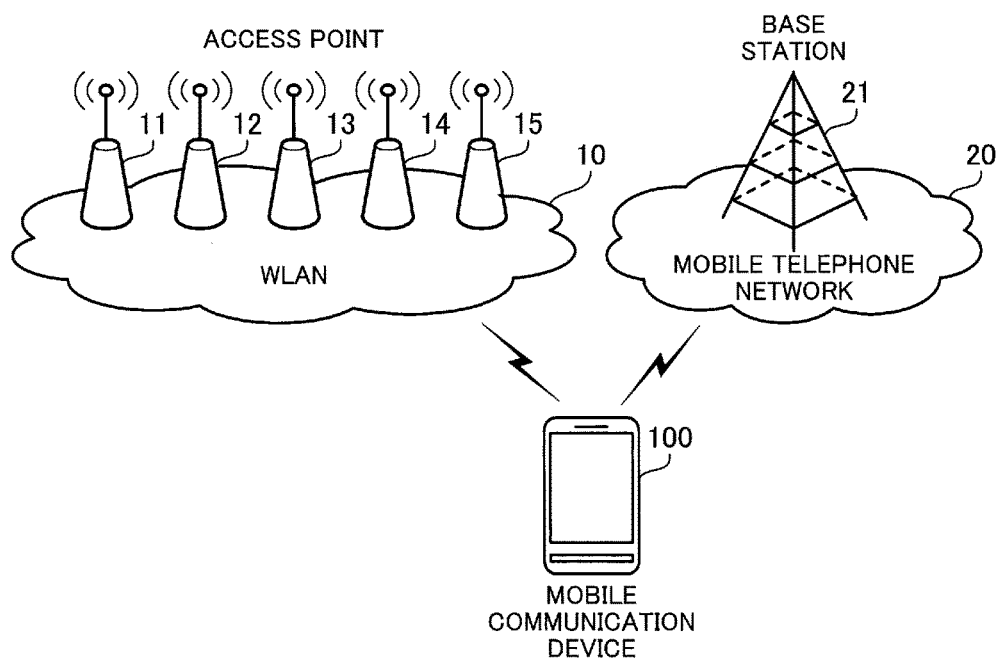
FIG. 2 illustrates a mobile communication system according to a second embodiment.

FIG. 2 illustrates a mobile communication system according to a second embodiment. The mobile communication system of the second embodiment includes a WLAN 10, a mobile telephone network 20, and a mobile communication device 100. The WLAN 10 has a plurality of access points including access points 11 to 15. The mobile telephone network 20 has a plurality of base stations including a base station 21. Note that the mobile communication device 100 is an example of the mobile communication device 1 of the first embodiment.

The access points 11 to 15 are wireless communication devices for wireless communication complying with the Institute of Electrical and Electronics Engineers (IEEE) 802.11 family of standards. The access points 11 to are also sometimes referred to as the base stations. The standards to be complied with include, for example, the IEEE 802.11g standard, the IEEE 802.11n standard, and the IEEE 802.11ac standard. The access points 11 to 15 may comply with Wi-Fi. Each of the access points 11 to 15 locally covers a part of the wireless area of the mobile telephone network 20. One could argue that the wireless area of the WLAN 10 is scattered within the wireless area of the mobile telephone network 20. The access points 11 to 15 are connected to a wired network, and relay data between the mobile communication device 100 and the wired network. For example, the access points 11 to 15 are connected to a data communication network for performing data communication using the Internet Protocol (IP).

The base station 21 is a wireless communication device for wireless communication complying with standards established by the 3rd Generation Partnership Project (3GPP). The standards to be complied with include, for example, Wideband Code Division Multiple Access (W-CDMA) and Long Term Evolution (LTE). The base station 21 covers a broad wireless area including the wireless area of the WLAN 10. In other words, the base station 21 forms a macro cell. The base station 21 is connected to a wired network and relays data between the mobile communication device 100 and the wired network. For example, the base station 21 is connected to the same data communication network to which the access points 11 to 15 are connected.

The mobile communication device 100 is a mobile wireless communication device provided with both a wireless interface using the WLAN 10 and a wireless interface using the mobile telephone network 20. The mobile communication device 100 is a user terminal operated by a user, such as a mobile phone, a smartphone, a PDA, a tablet terminal, or a notebook PC.

The mobile communication device 100 accesses a server belonging to the data communication network via the WLAN 10 or the mobile telephone network 20 to thereby receive data such as a web page, a still image, and a video. In addition, the mobile communication device 100 enables voice calls using a circuit switching system or a Voice over Internet Protocol (VoIP) service via the mobile telephone network 20. In addition, the mobile communication device 100 enables voice calls using a VoIP service via the WLAN 10. In VoIP communication, voice data is transmitted in packets.

Note here that the WLAN 10 includes a set of access points densely deployed by the same installer so as to cover a large area, such as a shopping mall and an office. These access points are sometimes deployed in such a manner that their wireless areas partially overlap one another. This allows the mobile communication device 100 to perform a handover between access points when traveling within an area such as a shopping mall or an office. In addition, the WLAN 10 includes access points each singularly installed to cover a small area, such as a private residence of the user and a small retail premise. In general, a handover is not performed between each singularly installed access point and its neighboring access points.

Assume however that the mobile communication device 100 does not know in advance whether one or more different access points to be handover destinations exist around each access point (i.e., whether a handover environment has been established). As described later, the mobile communication device 100 estimates whether a handover environment has been established, based on the detection status in relation to a plurality of access points. Assume in the second embodiment that the access points 11 to 15 belong to a single handover environment.

Each access point is assigned, as its identification information, a Basic Service Set Identifier (BSSID) and an ESSID. The BSSID is a 48-bit value used to physically identify each access point, and a medium access control (MAC) address of an access point is used as the BSSID of the access point. The ESSID is an alphanumeric value up to 32 characters long, used to logically identify a group to which the access point belongs. For example, a plurality of access point belonging to a WLAN service provided by a business operator may be assigned the same ESSID.

In addition, each access point may use one of fourteen channels belonging to the 2.4 GHz band for its wireless communication. Further, each access point may use one of nineteen channels belonging to the 5 GHz band for its wireless communication. One access point may use only one channel in either the 2.4 GHz band or the 5 GHz band, or may use channels in both the 2.4 GHz and the 5 GHz bands.

According to the second embodiment, all the access points 11 to 15 are assigned a common ESSID, "ESSID_00", by the same business operator. The access point 11 has a BSSID of "BSSID_01" and uses a channel CH1. The access point 12 has a BSSID of "BSSID_02" and uses a channel CH6. The access point 13 has a BSSID of "BSSID_03" and uses a channel CH44. The access point 14 has a BSSID of "BSSID_04" and uses a channel CH48. The access point 15 has a BSSID of "BSSID 05" and uses a channel CH11.

Figure 3:
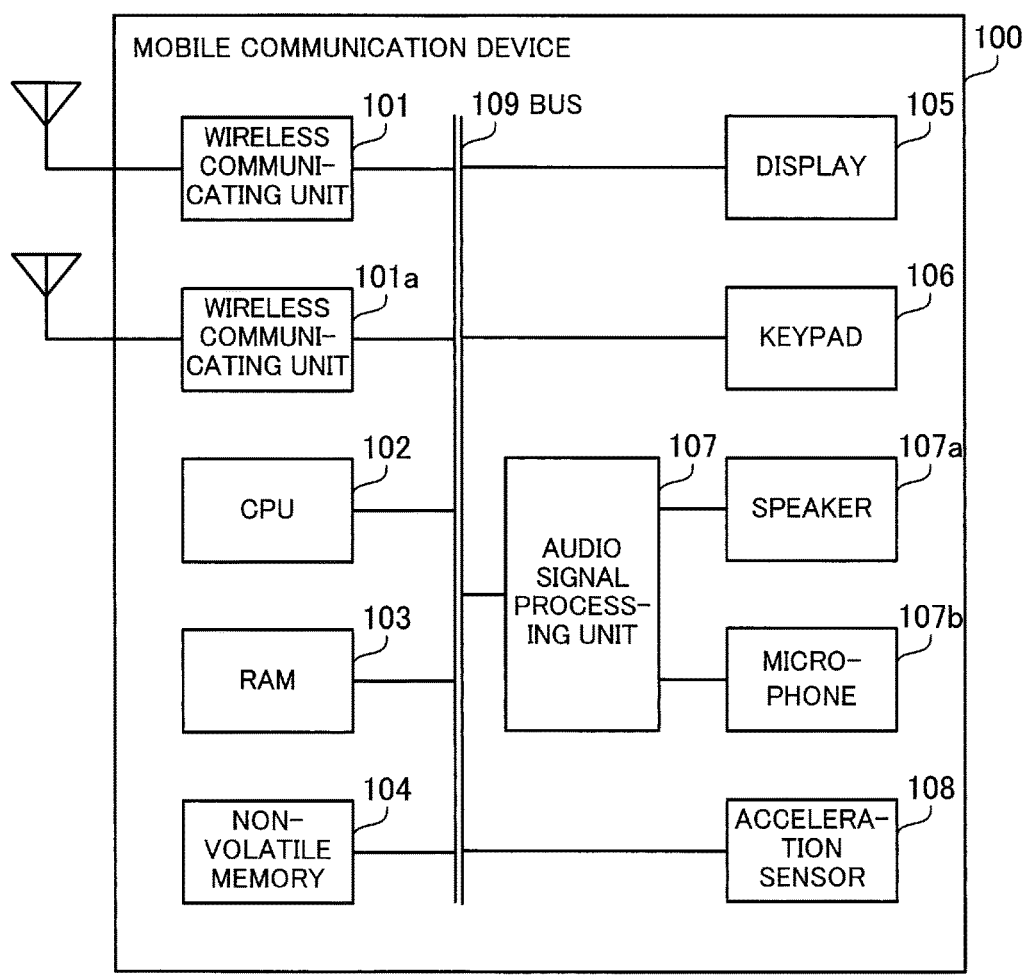
FIG. 3 illustrates an example of hardware of a mobile communication device.

FIG. 3 illustrates an example of hardware of the mobile communication device. The mobile communication device 100 includes wireless communicating units 101 and 101a, a CPU 102, RAM 103, non-volatile memory 104, a display 105, a keypad 106, an audio signal processing unit 107, a speaker 107a, a microphone 107b, and an acceleration sensor 108. The speaker 107a and the microphone 107b are connected to the audio signal processing unit 107. The remaining units are individually connected to a bus 109 in the mobile communication device 100. Note that the wireless communicating unit 101 is an example of the wireless communicating unit 1a of the first embodiment. The CPU 102 is an example of the control unit 1b of the first embodiment.

The wireless communicating unit 101 is a wireless interface for wirelessly communicating according to a communication method of the WLAN 10. The wireless communicating unit 101 runs a scan for access points according to an instruction from the CPU 102 and reports results of the scan to the CPU 102. In this regard, the wireless communicating unit 101 measures the strength of a signal received from each of detected access points. The second embodiment uses the RSSI as an index value representing the received signal strength. The scan results include the following information for each of the detected access points: BSSID; ESSID; channel number; and RSSI. In addition, the wireless communicating unit 101 performs a procedure to connect to an access point indicated by the CPU 102. This allows the mobile communication device 100 to perform data communication via the access point.

The wireless communicating unit 101a is a wireless interface for wirelessly communicating according to a communication method of the mobile telephone network 20. The wireless communicating unit 101a connects to the base station 21 according to an instruction from the CPU 102 to thereby perform data communication via the base station 21. When the mobile communication device 100 is not connected to any of the access points of the WLAN 10, data communication is performed using the wireless communicating unit 101a. On the other hand, when the mobile communication device 100 is connected to one of the access points of the WLAN 10, data communication is performed using the wireless communicating unit 101.

The CPU 102 may be a processor for executing programs. The CPU 102 loads at least part of a program and data stored in the non-volatile memory 104 into the RAM 103 to execute processes according to the program. Note that the CPU 102 may include a plurality of processor cores and the mobile communication device 100 may include a plurality of processors, and processes to be described later may be executed in parallel using the plurality of processors or processor cores. In addition, a set of a plurality of processors (multiprocessor) may be referred to as the "processor".

The RAM 103 is a volatile semiconductor memory for temporarily storing therein programs to be executed by the CPU 102 and data to be referred to by the programs. Note that the mobile communication device 100 may be provided with a different type of memory other than RAM, or may be provided with a plurality of memory devices.

The non-volatile memory 104 is a non-volatile storage device to store therein data and software programs, such as an operating system (OS), middleware, and application software. The programs include a communication control program for controlling wireless communication of the wireless communicating unit 101. As the non-volatile memory 104, flash memory may be used, for example. Note however that the mobile communication device 100 may be provided with a different type of non-volatile storage device, such as a hard disk drive (HDD), or may be provided with a plurality of types of storage devices.

According to an instruction from the CPU 102, the display 105 displays an operation screen and content such as a web page, a still image, and a video. Various types of displays including a liquid crystal display (LCD) and an organic electro-luminescence (OEL) display may be used as the display 105.

In order to save power consumption, the display 105 is able to switch the screen ON and OFF in response to an instruction from the CPU 102. The screen ON is a state in which power is supplied to the display 105 and an operation screen or the like is displayed. The screen OFF is a state in which power supply to the display 105 is stopped and an operation screen or the like is not displayed. For example, if a predetermined type of event, such as an incoming call or an input from the user, occurs during the screen OFF, the CPU 102 causes the display 105 to turn the screen ON. In addition, when a predetermined type of event does not occur over a certain period of time during the screen ON, the CPU 102 causes the display 105 to turn the screen OFF.

The keypad 106 is an input device for receiving an input from the user. The keypad 106 is provided with one or two or more keys, and outputs an input signal indicating a key pressed by the user to the CPU 102. Note that the mobile communication device 100 may be provided with a different input device, such as a touch panel, in place of or in addition to the keypad 106. For example, the touch panel is provided over the display 105. The touch panel detects a touch operation of the user on the display 105 and gives the CPU 102 notice of a touched point.

The audio signal processing unit 107 processes an audio signal according to an instruction from the CPU 102. The audio signal processing unit 107 acquires digital audio data and converts it into an analog audio signal, which is then output to the speaker 107a. In addition, the audio signal processing unit 107 acquires an analog audio signal from the microphone 107b and converts it into digital audio data.

The speaker 107a acquires an electrical signal as an audio signal from the audio signal processing unit 107 and converts it into physical vibrations to reproduce a sound. For example, when the user is talking on the phone, the voice of a person on the other end of the phone and background noise are reproduced. The microphone 107b converts physical vibrations of sound into an electrical signal and outputs the electrical signal as an audio signal to the audio signal processing unit 107. For example, when the user is talking on the phone, the voice of the user and background noise are input from the microphone 107b.

The acceleration sensor 108 is a sensor for detecting the movement of the mobile communication device 100. Upon receiving a request for movement information from the CPU 102, the acceleration sensor 108 determines whether the mobile communication device 100 is moving or is stationary. If the mobile communication device 100 is moving at the time of receiving the request, the acceleration sensor 108 notifies the CPU 102 of "moving". On the other hand, if the mobile communication device 100 is stationary at the time of receiving the request, the acceleration sensor 108 notifies the CPU 102 of "being stationary" and subsequently monitors the state of the movement of the mobile communication device 100. Then, at the time of detecting that the mobile communication device 100 is moving, the acceleration sensor 108 notifies the CPU 102 of "moving" and ends monitoring the state of the movement of the mobile communication device 100.

When using the WLAN 10, the mobile communication device 100 determines whether a handover environment has been established at the current location, that is, whether a plurality of access points among which a handover is possible have been deployed. When a handover environment has been established, the mobile communication device 100 runs a scan for access points using a different method at a different time from the case where a handover environment has not been established so as to facilitate a smooth handover.

Figure 4:
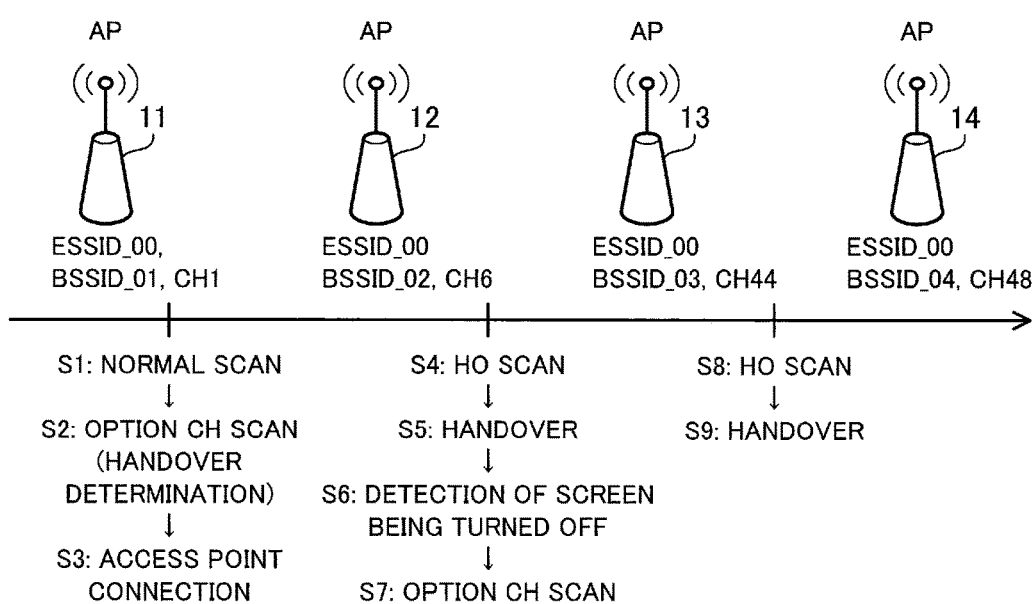
FIG. 4 illustrates an example of handover determination and option channel scanning.

Next described are operations of the mobile communication device 100 in a handover environment. FIG. 4 illustrates an example of handover determination and option channel scanning. When not connected to any access point of the WEAN 10, the mobile communication device 100 runs a normal scan (S1). In the normal scan, the mobile communication device 100 sets no limitations on channels to be scanned and an ESSID of access points to be detected. That is, the mobile communication device 100 detects access points existing near the mobile communication device 100 and operating on any channels. When detecting one or more access points each with the RSSI equal to or greater than a connection threshold, the mobile communication device 100 selects, from the detected access points, one with the highest RSSI. Assume here that the mobile communication device 100 selects the access point 11.

Next, the mobile communication device 100 determines whether a handover-destination access point exists around the access point 11 to which a connection is to be made, that is, whether a handover environment has been established. In order to determine the establishment state of a handover environment, the mobile communication device 100 runs an option channel (CH) scan (S2). In the option channel scan, the mobile communication device 100 does not set limitations on channels to be scanned but sets a limitation on an ESSID of access points to be detected. "ESSID_00" of the access point 11 to which a connection is to be made is designated as the ESSID of access points to be detected. In addition, the mobile communication device 100 sets an RSSI detection threshold for the option channel scan lower than that for the normal scan, allowing access points in the distance also to be detected.

When two or more access points each with the ESSID being "ESSID_00" have been detected by the option channel scan, the mobile communication device 100 determines that a handover environment has been established. On the other hand, when no access point with the ESSID being "ESSID_00" other than the access point 11 has been detected, the mobile communication device 100 determines that there is no handover environment. Assume here that the access points 11, 12, and 13 are detected by the option channel scan. Therefore, the mobile communication device 100 determines that a handover environment has been established at the current location.

After determining the establishment state of a handover environment, the mobile communication device 100 connects to the access point 11 selected by the normal scan (S3). Herewith, the mobile communication device 100 is able to perform data communication using the access point 11.

Subsequently, when the mobile communication device 100 moves away from the access point 11, the RSSI of the access point 11 decreases. When the mobile communication device 100 determined, before connecting to the access point 11, that a handover environment had been established and the RSSI of the access point 11 has dropped below a predetermined threshold, the mobile communication device 100 starts a handover (HO) scan while being connected to the access point 11 (S4). In the handover scan, the mobile communication device 100 sets limitations on channels to be scanned and an ESSID of access points to be detected. One or more channels on which access points were detected in the foregoing option channel scan are designated as the channels to be scanned. "ESSID_00" of the currently connected access point 11 is designated as the ESSID of access points to be detected.

Assume here that the mobile communication device 100 scans the channels CH1, CH6, and CH44 and detects the access points 11, 12, and 13 each assigned "ESSID_00". Setting limitations on the channels and ESSID shortens the amount of time needed for the handover scan, thus mitigating the impact on the data communication with the access point 11. Note that when determined, before connecting to the access point 11, that a handover environment had not been established, the mobile communication device 100 does not engage in operations for a handover. For example, the mobile communication device 100 does not start a scan until it moves outside the range of the access point 11. When having moved outside the range of the access point 11, for example, the mobile communication device 100 runs a normal scan without setting limitations on channels to be scanned and an ESSID of access points to be detected.

When detecting one or more access points with the RSSI equal to or greater than the connection threshold by the handover scan, the mobile communication device 100 selects, from the detected access points, one with the highest RSSI. When the difference between the RSSI of the currently connected access point 11 and that of the selected access point has reached or exceeded a predetermined value, the mobile communication device 100 starts a handover (S5). Assume here that a handover is carried out from the access point 11 to the access point 12. Herewith, the mobile communication device 100 is able to perform data communication using the access point 12.

Thereafter, the mobile communication device 100 detects that the screen of the display 105 is turned OFF (S6). In response, the mobile communication device 100 runs an option channel scan again (S7). As is the case with the option channel scan run before connecting to the access point 11, the mobile communication device 100 does not set limitations on channels to be scanned but limits an ESSID to be detected to "ESSID_00" of the currently connected access point 12. In addition, the mobile communication device 100 sets the RSSI detection threshold for the option channel scan lower than that for a normal scan. Results of the option channel scan this time are used to limit channels to be scanned by the next and following handover scans.

Assume here that the access points 11, 12, 13, and 14 are detected by the option channel scan. Starting the option channel scan in response to the screen being turned off mitigates the impact on the data communication with the access point 12. Note that an option channel scan is supposed to be run when data communication according to a user operation is unlikely to take place, and therefore running an option channel scan is not limited to when the screen is turned OFF. For example, an option channel scan may be run immediately after the screen of the display 105 is turned ON.

Later when the mobile communication device 100 moves away from the access point 12, the RSSI of the access point 12 decreases. When the RSSI of the access point 12 drops below a predetermined threshold, the mobile communication device 100 starts a handover scan while being connected to the access point 12 (S8). In this handover scan, the mobile communication device 100 limits channels to be scanned to the channels CH1, CH6, CH44, and CH48 according to the results of the foregoing option channel scan. In addition, the mobile communication device 100 limits the ESSID of access points to be detected to "ESSID_00" of the currently connected access point 12.

Assume here that the mobile communication device 100 selects the access point 13 based on the results of the handover scan. Then, the mobile communication device 100 performs a handover from the access point 12 to the access point 13 (S9). Herewith, the mobile communication device 100 is able to perform data communication using the access point 13.

Figure 5:
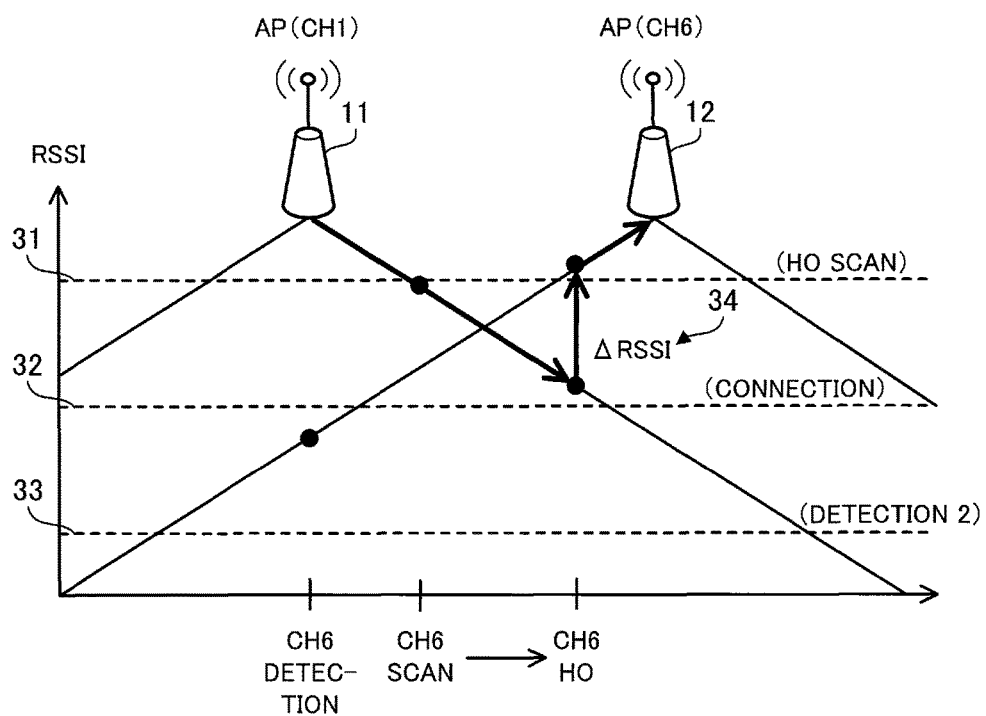
FIG. 5 illustrates an example of received signal strength thresholds.

FIG. 5 illustrates an example of received signal strength thresholds. As described above, thresholds used by the mobile communication device 100 includes thresholds 31 to 34. The threshold 31 is a "handover scan" threshold used to determine whether to start a handover scan while the mobile communication device 100 is connected to an access point. The threshold 32 is a "connection" threshold used to determine whether it is possible to connect to an access point. The threshold 32 may double as a "detection 1" threshold used to detect access points by a normal scan and a handover scan. The threshold 33 is a "detection 2" threshold used to detect access points by an option channel scan. The threshold 34 is a "handover start" threshold used to determine whether to start a handover.

The threshold 32 is higher than the threshold 33, and the threshold 31 is higher than the threshold 32. For example, assume that the thresholds 31, 32, and 33 are set to −60 dBm, −80 dBm, and −90 dBm, respectively. In addition, the threshold 34 is set to 10 de (difference in the RSSI), for example.

When the mobile communication device 100 measures the RSSI at a location near the access point 11, it is likely that the RSSI of the access point 11 is equal to or greater than the threshold 32 while the RSSI of the access point 12 is below the threshold 32. In this case, the access point 12 is not detected by a normal scan. Note however that, if the access points 11 and 12 are deployed more or less closely together to enable a handover, the RSSI of the access point 12 may be equal to or greater than the threshold 33. In this case, the access point 12 is detected by an option channel scan, and a handover environment is determined to have been established.

When the mobile communication device 100 moves close to the access point 12 after being connected to the access point 11, the RSSI of the access point 11 drops below the threshold 31. In response, the mobile communication device 100 starts a handover scan while being connected to the access point 11. The handover scan is run on the channel CH6 where an access point was detected by the option channel scan and detects the access point 12.

The RSSI of the access point 12 measured by the handover scan is likely to be already equal to or greater than the threshold 32. Note however that immediately after the start of the handover scan, the access point 11 may have a higher RSSI than the access point 12. In this case, it is more advantageous for the mobile communication device 100 to use the access point 11, and the mobile communication device 100 does not, therefore, start a handover yet and continues to run a handover scan. Later, as the mobile communication device 100 moves toward the access point 12, the RSSI of the access point 11 gradually decreases while the RSSI of the access point 12 gradually increases.

When the mobile communication device 100 moves further closer to the access point 12, the RSSI of the access point 12 becomes higher than that of the access point 11. Note however that while the difference in the RSSI between the access points 11 and 12 is small, the mobile communication device 100 is yet to start a handover in order to prevent the occurrence of repeated handovers, and continues to run a handover scan. Then, when the RSSI difference has reached or exceeded the threshold 34, the mobile communication device 100 starts a handover. By the handover, the mobile communication device 100 is disconnected from the access point 11 and connects to the access point 12.

Figure 6:
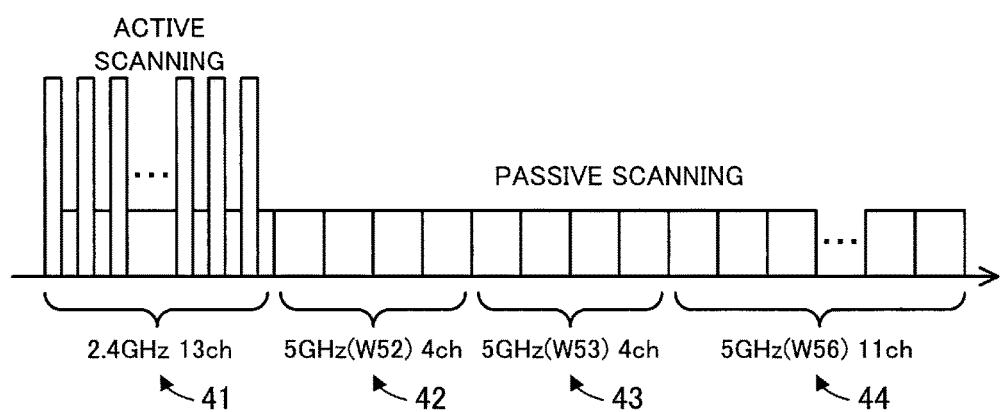
FIG. 6 illustrates an example of running a normal scan and an option channel scan.

FIG. 6 illustrates an example of running a normal scan and an option channel scan. Both in a normal scan and an option channel scan, a search is continuously run on all channels in the 2.4 GHz and 5 GHz bands. One round of both a normal scan and an option channel scan includes scanning periods 41 to 44. In the scanning period 41, active scanning is run on thirteen frequency channels belonging to the 2.4 GHz band. In the scanning period 42, passive scanning is run on four channels belonging to 5.15 GHz to 5.25 GHz (so-called W52 band) in the 5 GHz band. In the scanning period 43, passive scanning is run on four channels belonging to 5.25 GHz to 5.35 GHz (W53 band) in the 5 GHz band. In the scanning period 44, passive scanning is run on eleven channels belonging to 5.47 GHz to 5.725 GHz (W56 band) in the 5 GHz band. This scanning method takes approximately three to four seconds.

In the active scanning, a broadcast scan or unicast scan is performed. In the broadcast scan, the mobile communication device 100 transmits a probe request not designating an ESSID. Each access point having received the probe request returns a probe response including its BSSID and ESSID. In the unicast scan, the mobile communication device 100 transmits a probe request designating an ESSID. Each access point having received the probe request returns a probe response including its BSSID and ESSID only when the designated ESSID matches its own ESSID.

As in step S1 described above, in a normal scan, the active scanning is a broadcast scan. As in steps S2 and S7 above, in an option channel scan, the active scanning is a unicast scan. The time needed to transmit a probe request and receive a probe response for one channel is about 30 milliseconds.

In the passive scanning, the mobile communication device 100 detects beacon signals transmitted by access points. Each access point broadcasts a control signal called beacon with a predetermined period of time (for example, at intervals of 102.4 milliseconds). The beacon signal includes information, such as the BSSID and ESSID, corresponding to a probe response of active scanning. The time needed to detect a beacon signal for one channel is about 120 milliseconds.

Note that, in a normal scan and an option channel scan, not active scanning but passive scanning is used on channels in the 5 GHz band because transmitting 5 GHz band signals outdoors is restricted by regulations. Passive scanning is selected because, at the time of running a normal scan and an option channel scan, the mobile communication device 100 is not always able to determine whether the current location is indoor or outdoor. By selecting passive scanning, a normal scan and an option channel scan take a longer time than when selecting active scanning.

Note however that the mobile communication device 100 is able to assume that the current location is indoor if it has received signals on W52 or W53 in the 5 GHz band at or near the current location. This is because access points using W52 and W53 in the 5 GHz band are not supposed to be installed outdoors. In view of this, in the case of assuming that the current location is indoor from the results of an option channel scan, as described later, the mobile communication device 100 runs active scanning on channels in the 5 GHz band in the next handover scan.

Figure 7:
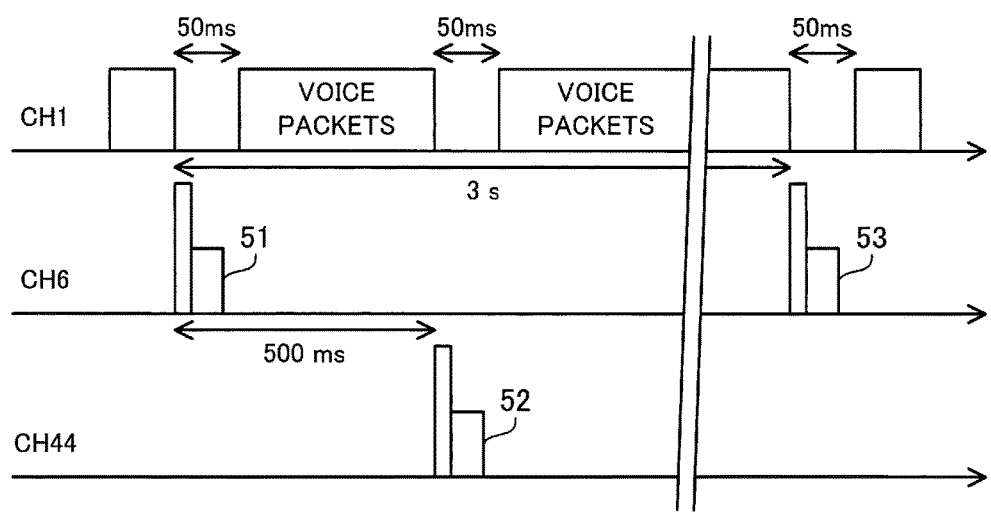
FIG. 7 illustrates an example of running a handover scan.

FIG. 7 illustrates an example of running a handover scan. In a handover scan, a search is limited to selected channels in order to mitigate the impact on data communication, unlike in the case of a normal scan and an option channel scan. In addition, in the case where a single handover scan targets two or more channels, appropriate time is provided between a search on one channel and a search on the next channel so as to allow data communication in the intervening period, instead of running the searches continuously. That is, a scan on two or more channels is performed intermittently. Assume here that the mobile communication device 100 is engaged in a VoIP voice call using the channel CH1.

The mobile communication device 100 transmits and receives voice packets to and from the access point 11 on the channel CH1. When starting a handover scan, the mobile communication device 100 stops transmission and reception of voice packets on the channel CH1 and performs a scanning operation 51 on the channel CH6. The scanning operation 51 is active and unicast scanning. In the scanning operation 51, the mobile communication device 100 transmits a probe request designating "ESSID_00" and then receives a probe response from the access point 12. Packet communication on the channel CH1 is interrupted by the scanning operation 51 for 50 milliseconds.

Upon completion of the scanning operation 51, the mobile communication device 100 resumes the transmission and reception of voice packets on the channel CH1. When 500 milliseconds has elapsed from the scanning operation 51, the mobile communication device 100 stops the transmission and reception of voice packets on the channel CH1 and, then, performs a scanning operation 52 on the channel CH44. Assume here that, since having received signals in the 5 GHz band in the foregoing option channel scan, the mobile communication device 100 assumes that the current location is indoor. In this case, then, the scanning operation 52 is active and unicast scanning. In the scanning operation 52, the mobile communication device 100 transmits a probe request designating "ESSID_00" and then receives a probe response from the access point 13.

Upon completion of the scanning operation 52, the mobile communication device 100 resumes the transmission and reception of voice packets on the channel CH1. In the case where the results of the first-round handover scan does not yet meet a condition to start a handover, the mobile communication device 100 starts a second-round handover scan at an interval. The second-round handover scan starts three seconds after the start of the first-round handover scan. When the predetermined time is reached, the mobile communication device 100 stops the transmission and reception of voice packets on the channel CH1 and, then, performs a scanning operation 53 on the channel CH6. The scanning operation 53 is active and unicast scanning, as in the case of the scanning operation 51.

As described above, the handover scan limits channels to be scanned and also intermittently performs scanning operations for a plurality of channels, thereby reducing the maximum delay time of voice packets. Therefore, even if a handover occurs while a voice call using the WLAN 10 is in progress, it is possible to maintain the call quality.

Figure 8:
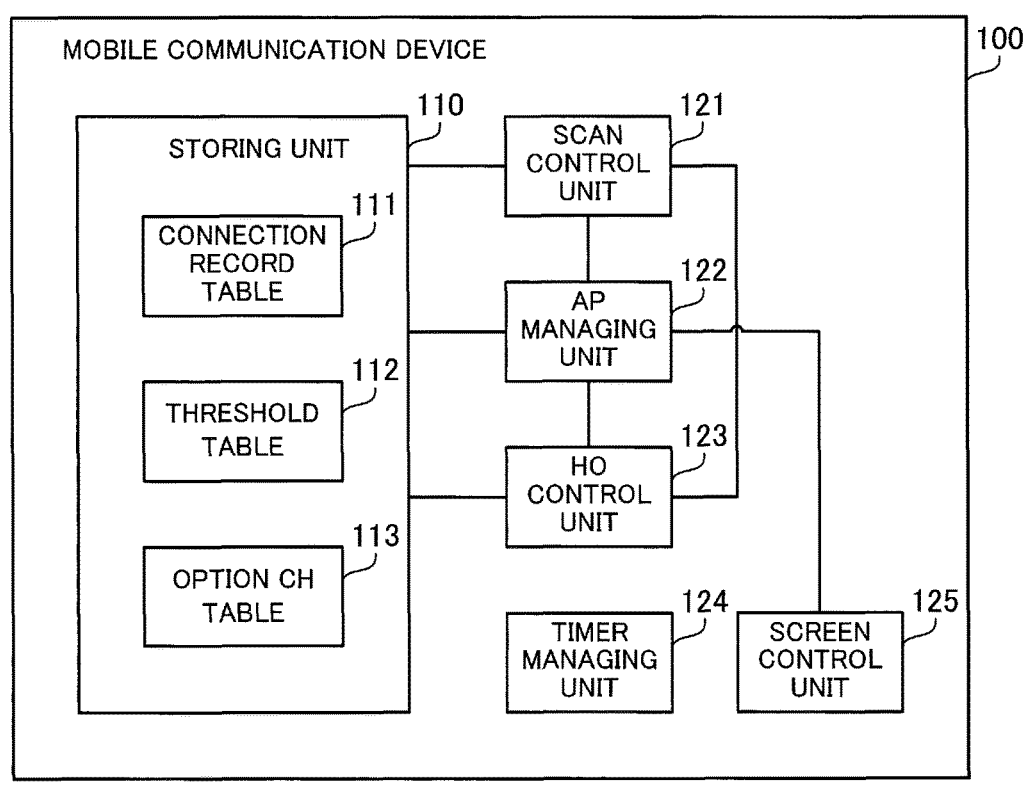
FIG. 8 is a block diagram illustrating an example of functions of the mobile communication device.

Next described are scan control functions of the mobile communication device 100. FIG. 8 is a block diagram illustrating an example of functions of the mobile communication device. The mobile communication device 100 includes a storing unit 110, a scan control unit 121, an access point managing unit 122, a handover control unit 123, a timer managing unit 124, and a screen control unit 125. The storing unit 110 may be implemented as a storage area allocated in the RAM 103 or the non-volatile memory 104. The scan control unit 121, the access point managing unit 122, the handover control unit 123, the timer managing unit 124, and the screen control unit 125 may be implemented as modules of a program executed by the CPU 102.

The storing unit 110 stores therein control information to be used to control scanning for access points and connection to an access point. The control information includes a connection record table 111, a threshold table 112, and an option channel table 113. The connection record table 111 registers therein the ESSID of each access point with which the mobile communication device 100 established a connection in the past according to an instruction from the user. The connection record table 111 may be updated by the access point managing unit 122. The threshold table 112 registers therein various types of thresholds including the handover scan threshold and the connection threshold. The thresholds may be set in advance, for example, at the time of manufacture or before shipment of the mobile communication device 100. In addition, after the mobile communication device 100 is shipped out, the thresholds may be updated in conjunction with software updates. The option channel table 113 registers therein option channels identified by option channel scans, that is, channels on which access points have been detected by option channel scans. The option channel table 113 is updated by the access point managing unit 122 in a timely and appropriate manner.

The scan control unit 121 instructs the wireless communicating unit 101 to run a scan and then acquires results of the scan from the wireless communicating unit 101. The scan control unit 121 may make a designation of scan-target ESSID and channels to the wireless communicating unit 101. In addition, the scan control unit 121 may designate an RSSI threshold to be set as a reference to detect access points. The scan control unit 121 transfers the scan results acquired from the wireless communicating unit 101 to the access point managing unit 122 or the handover control unit 123 depending on the type of the scan. The scan results include the BSSID, ESSID, channel number, and RSSI of each of detected access points.

Each normal scan places no limit on an ESSID to be detected and channels to be scanned. In addition, a normal scan uses the "detection 1" threshold as a detection reference. Results of a normal scan acquired from the wireless communicating unit 101 are transferred to the access point managing unit 122. Each option channel scan limits an ESSID to be detected but sets no limitations on channels to be scanned. In addition, an option channel scan uses, as its detection reference, the "detection 2" threshold lower than the "detection 1" threshold. Results of an option channel scan are transferred to the access point managing unit 122. Each handover scan limits an ESSID to be detected and channels to be scanned. In addition, a handover scan uses the "detection 1" threshold as its detection reference. Results of a handover scan are transferred to the handover control unit 123.

The access point managing unit 122 manages selection of an access point, connection to the selected access point, disconnection from a currently connected access point, and the like. Upon acquiring normal scan results from the scan control unit 121, the access point managing unit 122 determines whether one or more access points meeting an automatic connection condition have been detected. The automatic connection condition is a condition for connecting to the WLAN 10 without an instruction from the user. Specifically, the automatic connection condition is that the ESSID of an access point has been registered in the connection record table 111 and the RSSI of the access point is equal to or greater than the "connection" threshold. If one or more access points meeting the condition have been detected, the access point managing unit 122 determines, amongst the detected access points, one with the highest RSSI as a connection destination, and also instructs the scan control unit 121 to run an option channel scan.

When acquiring results of the option channel scan from the scan control unit 121 before the start of a connection to the determined access point, the access point managing unit 122 determines whether a handover environment has been established at the current location. When two or more access points with the same ESSID have been detected, the access point managing unit 122 determines that a handover environment has been established and updates the option channel table 113. Otherwise, the access point managing unit 122 determines that there is no handover environment. Then, the access point managing unit 122 instructs the wireless communicating unit 101 to start the connection to the access point determined earlier. In addition, when notified by the screen control unit 125 of the screen being turned OFF, the access point managing unit 122 instructs the scan control unit 121 to run an option channel scan. When acquiring results of the option channel scan from the scan control unit 121 after connecting to the determined access point, the access point managing unit 122 updates the option channel table 113.

When the access point managing unit 122 has determined that a handover environment has been established, the handover control unit 123 controls a handover between access points. When the wireless communicating unit 101 detects that the RSSI of the currently connected access point has fallen below the "handover scan" threshold, the handover control unit 123 acquires notice of a decrease in the RSSI via the scan control unit 121. In response, the handover control unit 123 instructs the scan control unit 121 to run a handover scan.

Upon acquiring results of the handover scan from the scan control unit 121, the handover control unit 123 determines whether one or more different access points meeting a handover condition have been detected. The handover condition is that the RSSI of an access point is equal to or greater than the "connection" threshold and higher than the RSSI of the currently connected access point, and the difference between the RSSI of the access point and that of the currently connected access point is equal to or greater than the "handover start" threshold. When one or more access points meeting the handover condition have been detected, the handover control unit 123 determines, amongst the detected access points, one with the highest RSSI as a handover destination. Then, the handover control unit 123 instructs the wireless communicating unit 101 to disconnect from the currently connected access point and connect to the handover-destination access point.

The timer managing unit 124 manages the length of time that has elapsed. The timer managing unit 124 may be used by the access point managing unit 122 or the handover control unit 123 in order to control a scanning period. In the case where a timer time is designated by the access point managing unit 122 or the handover control unit 123, the timer managing unit 124 notifies, when the period of the timer time has elapsed since the timer time was designated, the unit having designated the timer time of the designated timer time having elapsed.

The screen control unit 125 controls turning the screen of the display 105 ON and OFF. When the screen of the display 105 is turned OFF according to a user operation or when a predetermined time has elapsed, the screen control unit 125 notifies the access point managing unit 122 of the screen being turned OFF.

Figure 9:
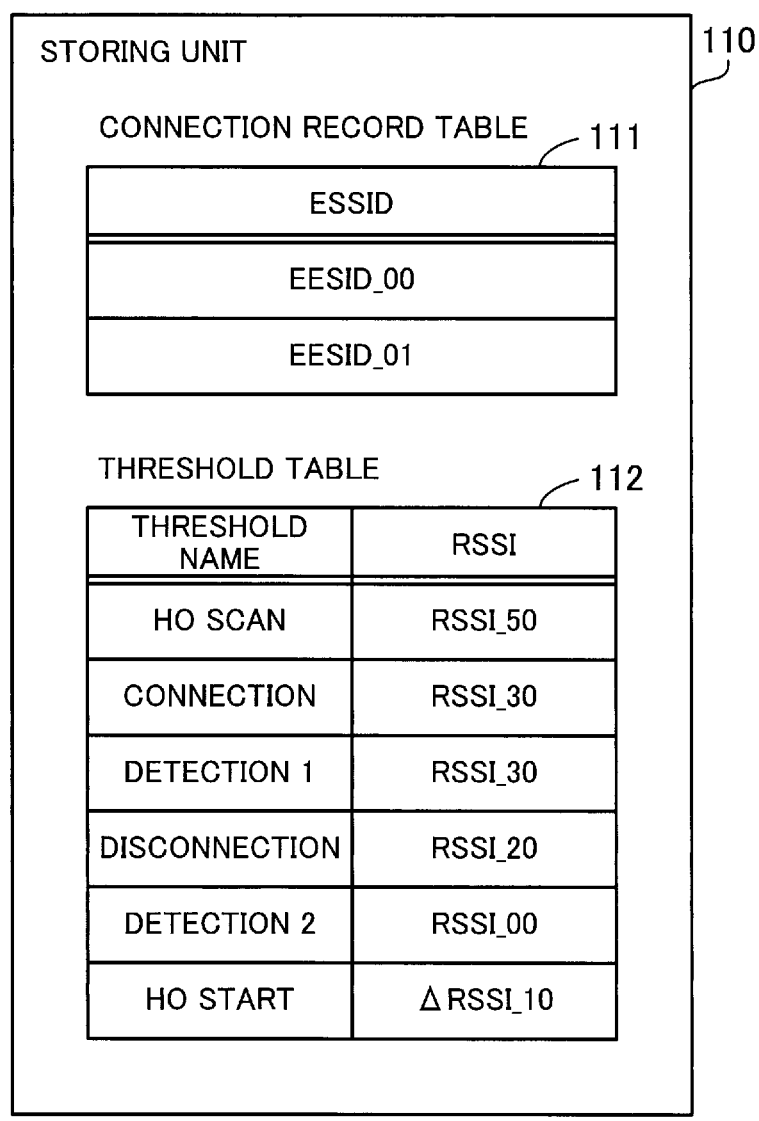
FIG. 9 illustrates an example of a connection record table and a threshold table.

FIG. 9 illustrates an example of the connection record table and the threshold table. The connection record table 111 is stored in the storing unit 110. The connection record table 111 includes an ESSID list. The ESSID list includes ESSIDs of access points to each of which a connection was made in the past according to an instruction from the user. The mobile communication device 100 is able to automatically connect to each access point with the same ESSID as that of an access point selected by the user in the past, without an explicit instruction from the user. According to the example of FIG. 9, "ESSID_00" and "ESSID_01" are registered in the connection record table 111.

The threshold table 112 is stored in the storing unit 110. The threshold table 112 includes a list of threshold names and their individually associated RSSI values. The threshold names include "handover scan", "connection", "detection 1", "disconnection", "detection 2", and "handover start". The "handover scan" threshold is an RSSI threshold used to determine whether to start a handover scan and, for example, set to −60 dBm. The "connection" threshold is an RSSI threshold used to determine whether a connection to an access point is possible and, for example, set to −80 dBm. The "detection 1" threshold is an RSSI threshold used as a reference to detect one or more access points by a normal scan or a handover scan. The "detection 1" threshold may usually be the same as the "connection" threshold. The "disconnection" threshold is an RSSI threshold used to determine whether to disconnect from a currently connected access point and, for example, set to −85 dBm. The "detection 2" threshold is an RSSI threshold used as a reference to detect one or more access points by an option channel scan and, for example, set to −90 dBm. The "handover start" threshold is an RSSI difference threshold used to determine whether a handover is possible and, for example, set to 10 dB.

In the following description, a notation combining "RSSI_" with a two-digit number may be used to represent the magnitude of each RSSI. The two-digit number being higher indicates the associated RSSI being higher. Assume in the following description that the "handover scan" threshold is RSSI_50, each of the "connection" threshold and the "detection 1" threshold is RSSI 30, the "disconnection" threshold is RSSI_20, the "detection 2" threshold is RSSI_00, and the "handover start" threshold is ΔRSSI_10.

FIG. 10 illustrates an example of the option channel table. The option channel table 113 is stored in the storing unit 110. The option channel table 113 includes columns of the following items: ESSID; BSSID; channel; option channel; and outdoor flag. Each field in the individual ESSID and BSSID columns contains the ESSID and BSSID, respectively, of an access point. Each field in the channel column contains the number of a channel used by the corresponding access point. Each field in the option channel column contains the channel number of one or more different access points having been detected at the same place as the corresponding access point by an option channel scan.

Each field in the outdoor flag column includes the value indicating whether the installation place of the corresponding access point is outdoor. The outdoor flag is set to 1 when the installation place is assumed to be outside. The outdoor flag is set to 0 when the installation place is assumed to be indoor. In the case of receiving signals on W52 or W53 in the 5 GHz band by an option channel scan, the installation place is assumed to be indoor. On the other hand, in the case of not receiving signals on W52 or W53 in the 5 GHz band by an option channel scan, the installation place is assumed to be outdoor.

Figure 11:
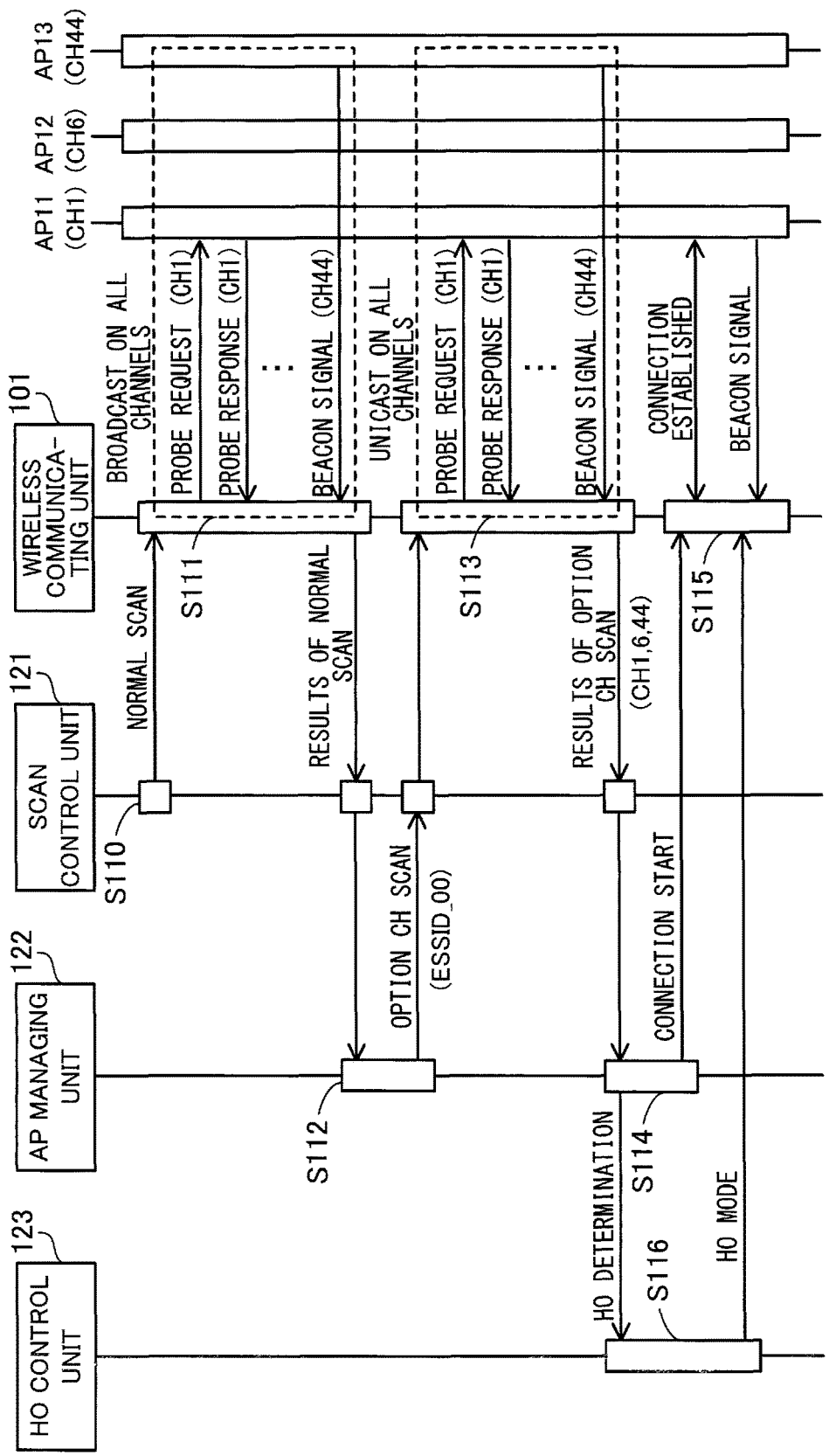
FIG. 11 is a sequence diagram illustrating a flow example of an access point connection.

FIG. 11 is a sequence diagram illustrating a flow example of an access point connection. Assume here that the mobile communication device 100 is located near the access points 11, 12, and 13 but closest to the access point 11. When the user turns ON the WLAN function of the mobile communication device 100, the scan control unit 121 gives the wireless communicating unit 101 notice of a normal scan (S110). The wireless communicating unit 101 runs a scan on all the channels in the 2.4 GHz and 5 GHz bands. The scan on channels in the 2.4 GHz band is active scanning as well as broad scanning without setting any limitations on ESSIDs to be detected. The scan on channels in the 5 GHz band is passive scanning because it is unknown that the current location is indoor or outdoor. The wireless communicating unit 101 receives a probe response from the access point 11 on the channel CH1; a probe response from the access point 12 on the channel CH6; and a beacon signal from the access point 13 on the channel CH44 (S111).

Assume here that the RSSI of the access point 11 is RSSI_60, the RSSI of the access point 12 is RSSI_50, and the RSSI of the access point 13 is RSSI_25. The wireless communicating unit 101 detects the access points 11 and 12 each of whose RSSI is equal to or greater than the "detection 1" threshold and notifies the scan control unit 121 of the results of the normal scan.

The scan control unit 121 notifies the access point managing unit 122 of the results of the normal scan. The access point managing unit 122 confirms that the ESSIDs of the access points 11 and 12 are registered in the connection record table 111 and the RSSIs of the access points 11 and 12 are individually equal to or greater than the "connection" threshold. Then, the access point managing unit 122 determines the access point 11 with the higher RSSI as a connection destination, and gives the scan control unit 121 notice of an option channel scan (S112). The option channel scan notice designates "ESSID_00" which is the ESSID of the connection destination.

The scan control unit 121 gives the wireless communicating unit 101 notice of the option channel scan. In addition, the scan control unit 121 decreases the RSSI threshold from the "detection 1" threshold to the "detection 2" threshold. The wireless communicating unit 101 runs a scan not setting limitations on channels to be scanned but limiting an ESSID to be detected to "ESSID_00". The scan on channels in the 2.4 GHz band is active and unicast scanning. The scan on channels in the 5 GHz band is passive scanning. The wireless communicating unit 101 receives a probe response from the access point 11 on the channel CH1; a probe response from the access point 12 on the channel CH6; and a beacon signal from the access point 13 on the channel CH44 (S113).

Assume here that the RSSI of the access point 11 is RSSI_60, the RSSI of the access point 12 is RSSI_50, and the RSSI of the access point 13 is RSSI_25. The wireless communicating unit 101 detects the access points 11, 12, and 13 each of whose RSSI is equal to or greater than the "detection 2" threshold and notifies the scan control unit 121 of the results of the option channel scan.

The scan control unit 121 notifies the access point managing unit 122 of the results of the option channel scan. The access point managing unit 122 determines that a handover environment has been established because a plurality of access points have been detected. Then, the access point managing unit 122 updates the option channel table 113 based on the results of the option channel scan. That is, the access point managing unit 122 registers the access points 11, 12, and 13 in the option channel table 113. In addition, the access point managing unit 122 adds the channels CH6 and CH44 as option channels of the access point 11, the channels CH1 and CH44 as option channels of the access point 12, and the channels CH1 and CH6 as option channels of the access point 13. This procedure is to mutually associate the channels CH1, CH6, and CH44 of the access points detected at the same place.

In addition, because the channel 44 belonging to W52 in the 5 GHz band has been detected, the access point managing unit 122 assumes that the current location is indoor and sets the outdoor flag of the access point 11 to 0. The access point managing unit 122 gives the handover control unit 123 notice of handover determination and also gives the wireless communicating unit 101 notice of a connection start (S114). The connection start notice designates the BSSID, ESSID, and channel number of the access point 11.

The wireless communicating unit 101 performs a connection procedure with the access point 11 using the channel CH1. After connecting to the access point 11, the wireless communicating unit 101 periodically (for example, at intervals of 100 milliseconds) receives a beacon signal sent from the access point 11 (S115). Upon receiving the handover determination notice from the access point managing unit 122, the handover control unit 123 starts handover control and gives the wireless communicating unit 101 notice of a handover mode (S116).

Figure 12:
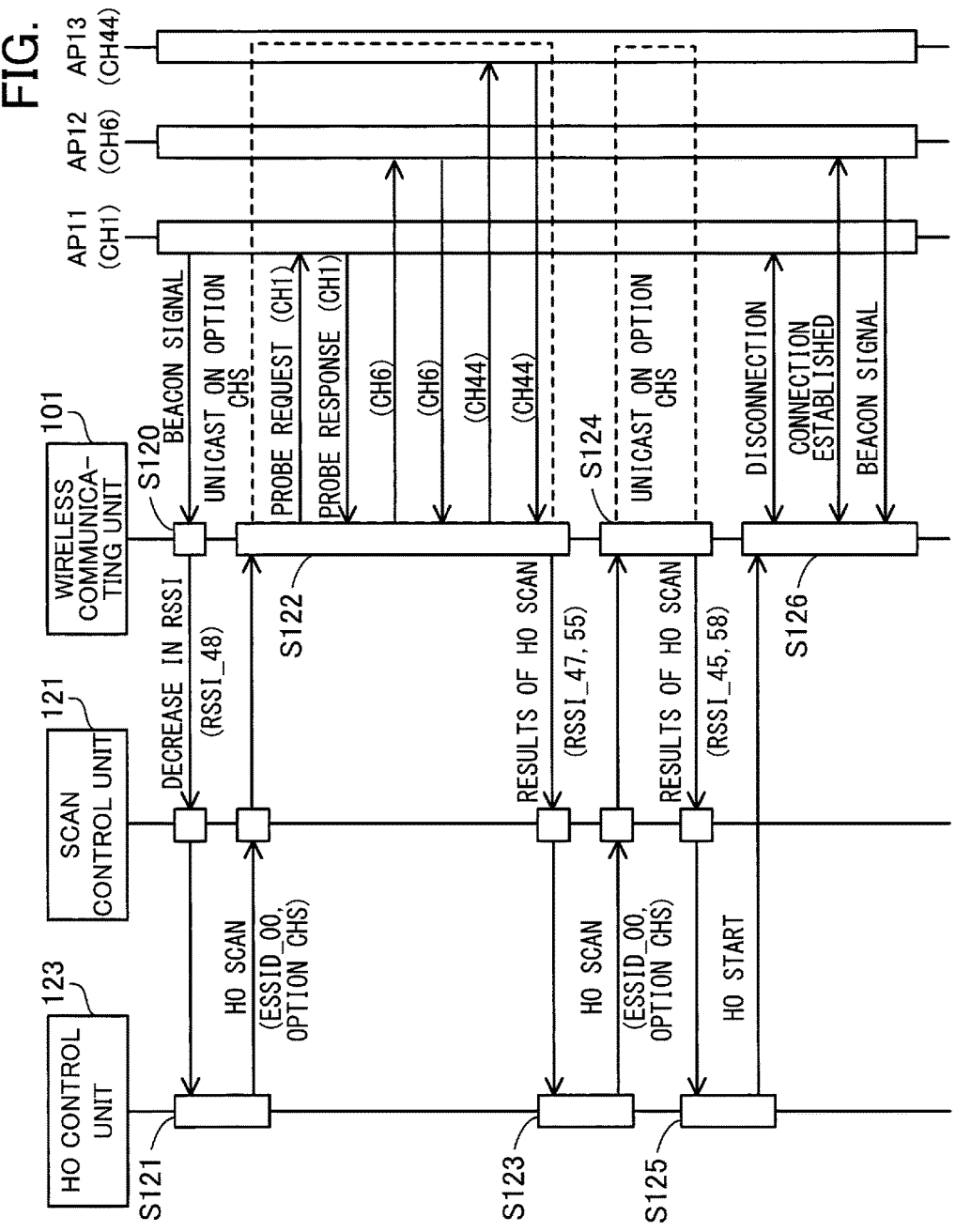
FIG. 12 is a sequence diagram illustrating a flow example of a handover.

FIG. 12 is a sequence diagram illustrating a flow example of a handover. Assume here that the mobile communication device 100 is moving from the access point 11 toward the access point 12 while being connected to the access point 11. The wireless communicating unit 101 receives a beacon signal from the access point 11 and measures the RSSI. Assume that the RSSI of the access point 11 is RSSI_48. The wireless communicating unit 101 detects that the RSSI is below the "handover scan" threshold and notifies the scan control unit 121 of a decrease in the RSSI (S120).

The scan control unit 121 notifies the handover control unit 123 of the decrease in the RSSI. The handover control unit 123 searches the option channel table 113 for the option channels and outdoor flag corresponding to the access point 11. Then, the handover control unit 123 gives the scan control unit 121 notice of a handover scan (S121). The handover scan notice designates "ESSID_00" of the access point 11, the channels CH1, CH6, and CH44, and the outdoor flag set to 0. Note that the handover control unit 123 designates, as the option channels, not only those registered in the option channel table 113 but also the channel CH1 of the currently connected access point 11.

The scan control unit 121 gives the wireless communicating unit 101 notice of the handover scan. The wireless communicating unit 101 runs a scan, limiting the search only to the option channels and access points with "ESSID 00". The scan on channels in the 2.4 GHz band is active and unicast scanning. Because of the outdoor flag set to 0, the scan on channels in the 5 GHz band is also active and unicast scanning. The wireless communicating unit 101 receives a probe response from the access point 11 on the channel CH1 and a probe response from the access point 12 on the channel CH6. In addition, the wireless communicating unit 101 transmits a probe request also on the channel CH44 and then receives a probe response from the access point 13 (S122).

Assume here that the RSSI of the access point 11 is RSSI_47, the RSSI of the access point 12 is RSSI_55, and the RSSI of the access point 13 is RSSI_25. The wireless communicating unit 101 extracts the access points 11 and 12 each of whose RSSI is equal to or greater than the "detection 1" threshold and notifies the scan control unit 121 of the results of the handover scan.

The scan control unit 121 notifies the handover control unit 123 of the results of the handover scan. The handover control unit 123 confirms that the RSSI of the access point 12 is equal to or greater than the "connection" threshold. On the other hand, the handover control unit. 123 calculates the difference between the maximum RSSI, RSSI_55, and RSSI 47 of the access point 11, and confirms that the RSSI difference is below the "handover start" threshold. Therefore, the handover control unit 123 waits for a predetermined period of time (for example, 3 seconds), and then gives the scan control unit 121 notice of a handover scan again (S123).

The scan control unit 121 gives the wireless communicating unit 101 notice of the handover scan. As in step S122 above, the wireless communicating unit 101 runs a scan, limiting the search only to the option channels and access points with "ESSID_00" (S124). Assume here that the RSSI of the access point 11 is RSSI_45, the RSSI of the access point 12 is RSSI_58, and the RSSI of the access point 13 is RSSI_25. The wireless communicating unit 101 extracts the access points 11 and 12 each of whose RSSI is equal to or greater than the "detection 1" threshold and notifies the scan control unit 121 of the results of the handover scan.

The scan control unit 121 notifies the handover control unit 123 of the results of the handover scan. The handover control unit 123 confirms that the RSSI of the access point 12 is equal to or greater than the "connection" threshold. In addition, the handover control unit 123 calculates the difference between the maximum RSSI, RSSI_58, and RSSI_45 of the access point 11, and confirms that the RSSI difference is equal to or greater than the "handover start" threshold. Therefore, the handover control unit 123 determines that a handover is possible and gives the wireless communicating unit 101 notice of a handover start (S125). The handover start notice designates the BSSID, ESSID and channel number of the access point 12.

The wireless communicating unit 101 performs a disconnection procedure with the access point 11 and performs a connection procedure with the access point 12. After connecting to the access point 12, the wireless communicating unit 101 periodically receives a beacon signal sent from the access point 12 (S126).

Figure 13:
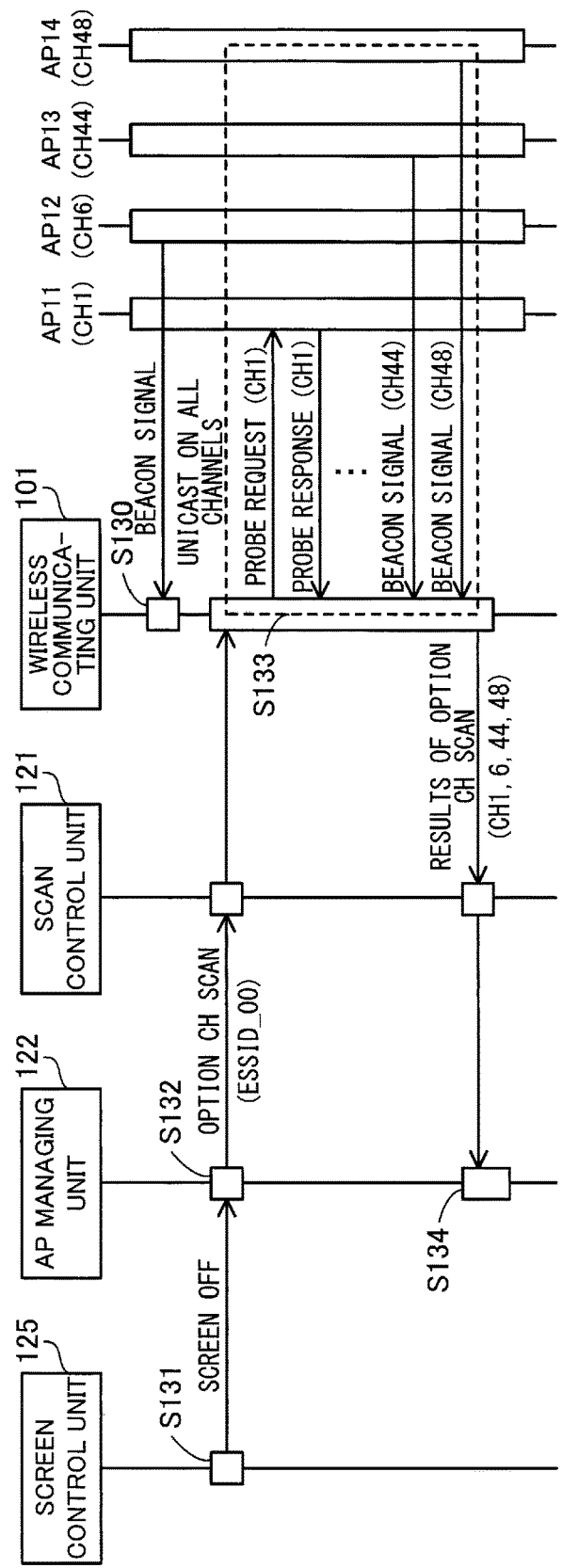
FIG. 13 is a sequence diagram illustrating a flow example of an option channel update.

FIG. 13 is a sequence diagram illustrating a flow example of an option channel update. Assume here that the mobile communication device 100 is connected to the access point 12, and is moving in closer to the access point 14. The wireless communicating unit 101 periodically receives a beacon signal from the access point 12 and measures the RSSI (S130). When the screen of the display 105 is turned OFF, the screen control unit 125 gives the access point managing unit 122 notice of the screen being turned OFF (S131). The access point managing unit 122 gives the scan control unit 121 notice of an option channel scan (S132). The option channel scan notice designates "ESSID_00" of the access point 12.

The scan control unit 121 gives the wireless communicating unit 101 notice of the option channel scan. In addition, the scan control unit 121 decreases the RSSI threshold from the "detection 1" threshold to the "detection 2" threshold. As in step S113 above, the wireless communicating unit 101 runs a scan without setting limitations on channels to be scanned but limiting the search only to access points with "BSSID_00". The wireless communicating unit 101 receives a probe response from the access point 11 on the channel CH1; a probe response from the access point 12 on the channel CH6; and a beacon signal from the access point 13 on the channel CH44. In addition, the wireless communicating unit 101 newly receives a beacon signal from the access point 14 on the channel CH48 (S133).

Assume here that the RSSI of the access point 11 is RSSI_50, the RSSI of the access point 12 is RSSI_60, the RSSI of the access point 13 is RSSI_45, and the RSSI of the access point 14 is RSSI_45. The wireless communicating unit 101 detects the access points 11, 12, 13, and 14 each of whose RSSI is equal to or greater than the "detection 2" threshold and notifies the scan control unit 121 of the results of the option channel scan.

The scan control unit 121 notifies the access point managing unit 122 of the results of the option channel scan. The access point managing unit 122 updates the option channel table 113 based on the results of the option channel scan. That is, the access point managing unit 122 registers the access point 14 in the option channel table 113. The access point managing unit 122 also adds the channel CH48 as an option channel of each of the access points 11, 12, and 13, and adds the channels CH1, CH6, and CH44 as option channels of the access point 14 (S134).

Figure 14:
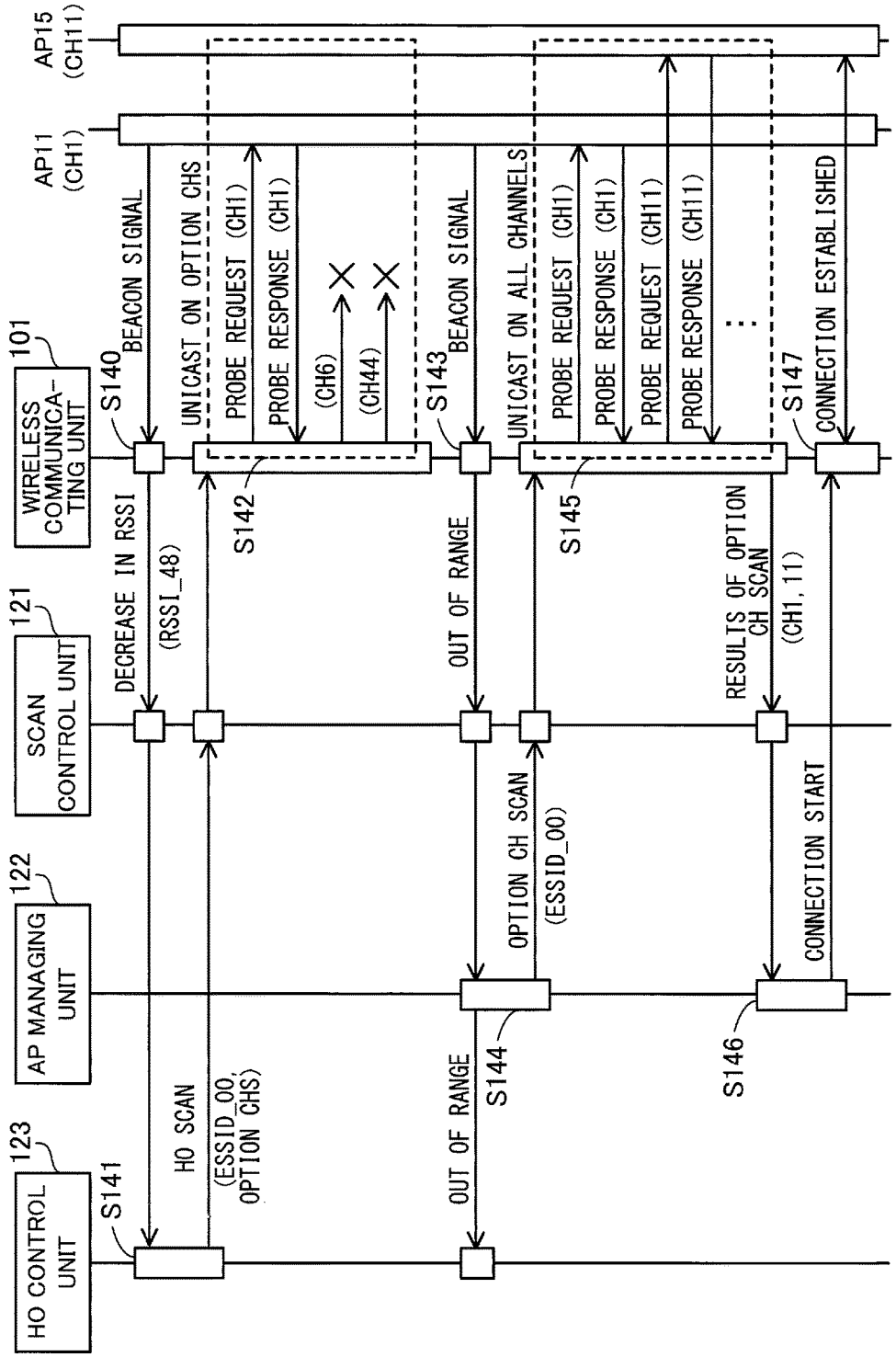
FIG. 14 is a sequence diagram illustrating a flow example of a reconnection after going out of range.

FIG. 14 is a sequence diagram illustrating a flow example of reconnection after going out of range. Assume here that, after being connected to the access point 11, the mobile communication device 100 is moving from the access point 11 toward the access point 15. The wireless communicating unit 101 receives a beacon signal from the access point 11 and measures the RSSI. Assume that the RSSI of the access point 11 is RSSI_40. The wireless communicating unit 101 detects that the RSSI is below the "handover scan" threshold and notifies the scan control unit 121 of a decrease in the RSSI (S140).

The scan control unit 121 notifies the handover control unit 123 of the reduction in the RSSI. The handover control unit 123 gives the scan control unit 121 notice of a handover scan (S141). The handover scan notice designates "ESSID_00", the option channels CH1, CH6, and CH44, and the outdoor flag set to 0, corresponding to the access point 11.

The scan control unit 121 gives the wireless communicating unit 101 notice of the handover scan. As in step S122 above, the wireless communicating unit 101 runs a scan, limiting the search only to the option channels and access points with "ESSID_00". The wireless communicating unit 101 receives a probe response from the access point 11 on the channel CH1. On the other hand, because a probe request on the channel CH6 did not reach the access point 12, the wireless communicating unit 101 receive no probe response from the access point 12. In addition, because a probe request on the channel CH44 did not reach the access point 13, the wireless communicating unit 101 receive no probe response from the access point 13 (S142).

That is, in the handover scan, the wireless communicating unit 101 failed in detecting handover-destination access points. Then, the wireless communicating unit 101 receives a beacon signal from the access point 11 and measures the RSSI. Assume here that the RSSI of the access point 11 is RSSI 15. The wireless communicating unit 101 detects that the RSSI is below the "disconnection" threshold and gives the scan control unit 121 notice of being out of range (S143).

The scan control unit 121 gives the access point managing unit 122 notice of being out of range. The access point managing unit 122 gives the handover control unit 123 notice of being out of range. Herewith, the handover control unit stops its handover control. In addition, the access point managing unit 122 gives the scan control unit 121 notice of an option channel scan (S144). The option channel scan notice designates "ESSID_00" of the access point 11 to which the mobile communication device 100 was connected just before going out of range.

The scan control unit 121 gives the wireless communicating unit 101 notice of the option channel scan. In addition, the scan control unit 121 decreases the RSSI threshold from the "detection 1" threshold to the "detection 2" threshold. As in step S113 above, the wireless communicating unit 101 runs a scan without setting limitations on channels to be scanned but limiting the search only to access points with "ESSID_00". The wireless communicating unit 101 receives a probe response from the access point 11 on the channel CH1 and a probe response from the access point 15 on the channel CH11 (S145). Assume here that the RSSI of the access point 11 is RSSI_15 and the RSSI of the access point 15 is RSSI_40. The wireless communicating unit 101 detects the access points 11 and 15 each of whose RSSI is equal to or greater than the "detection 2" threshold and notifies the scan control unit 121 of the results of the option channel scan.

The scan control unit 121 notifies the access point managing unit 122 of the results of the option channel scan. The access point managing unit 122 updates the option channel table 113 based on the results of the option channel scan. That is, the access point managing unit 122 registers the access point 15 in the option channel table 113. The access point managing unit 122 also adds the channel CH11 as an option channel of the access point 11 and adds the channel CH1 as an option channel of the access point 15.

In addition, the access point managing unit 122 confirms that the RSSI of the access point 15 is equal to or greater than the "connection" threshold. Then, the access point managing unit 122 determines the access point as a connection destination and gives the wireless connecting unit 101 notice of a connection start (S146). The wireless communicating unit 101 performs a connection procedure with the access point 11 using the channel CH11 (S147). Thus, in a place where a handover environment has been established, running an option channel scan in place of a normal scan when the mobile communication device 100 has moved out of the range of the connected access point may allow quick detection of a different connectable access point.

Figure 15:
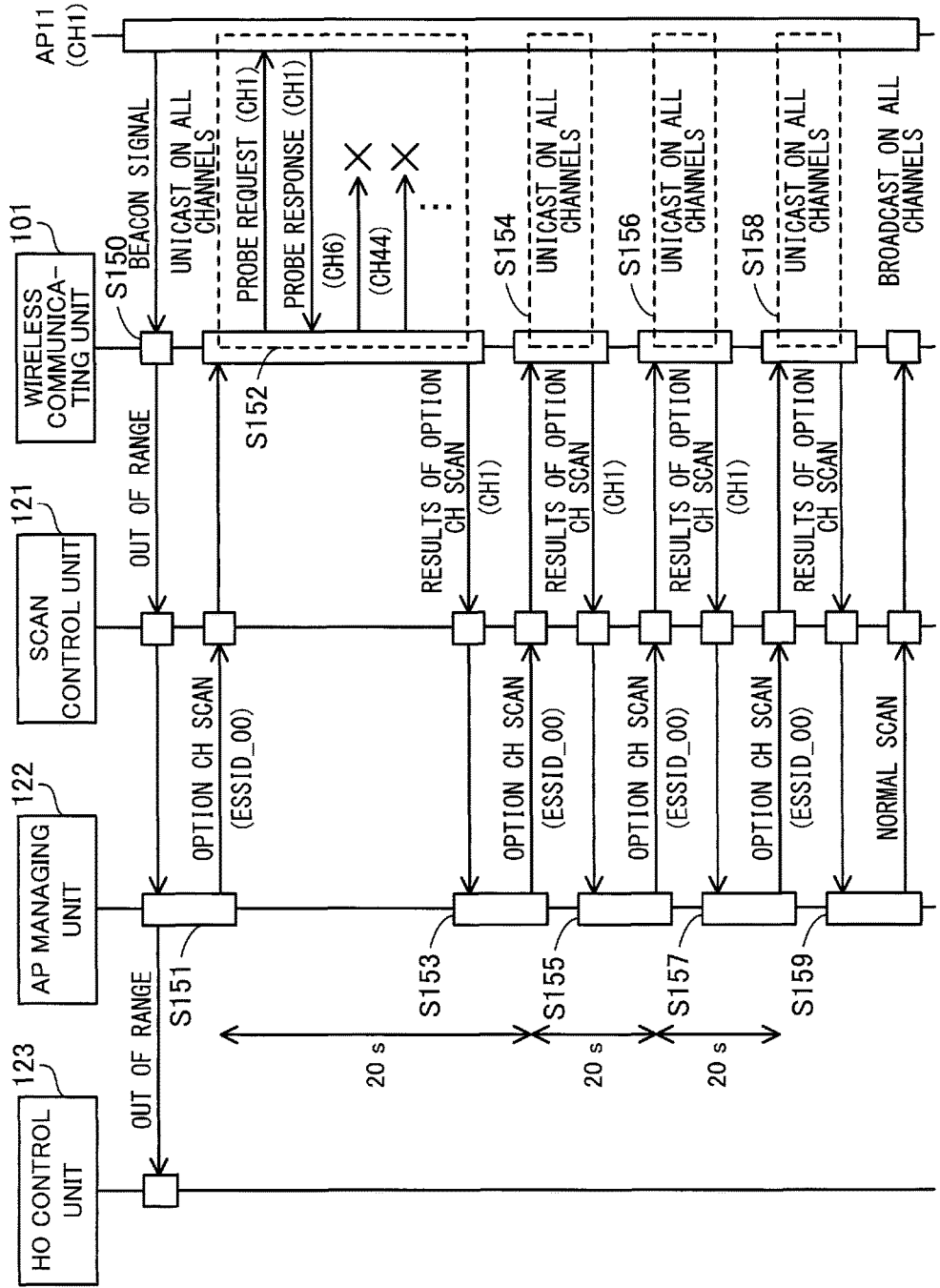
FIG. 15 is a sequence diagram illustrating a flow example of an out-of-range scan.

FIG. 15 is a sequence diagram illustrating a flow example of an out-of-range scan. Assume here that, after being connected to the access point 11, the mobile communication device 100 is moving away from all the access points 11 to 15. The wireless communicating unit 101 receives a beacon signal from the access point 11 and measures the RSSI. Assume that the RSSI of the access point 11 is RSSI_15. The wireless communicating unit 101 detects that the RSSI is below the "disconnection" threshold and gives the scan control unit 121 notice of being out of range (S150).

The scan control unit 121 gives the access point managing unit 122 notice of being out of range. The access point managing unit 122 gives the handover control unit 123 notice of being out of range. Herewith, the handover control unit 123 stops its handover control. In addition, the access point managing unit 122 gives the scan control unit 121 notice of an option channel scan (S151). The option channel scan notice designates "ESSID_00" of the access point 11 to which the mobile communication device 100 was connected just before going out of range.

The scan control unit 121 gives the wireless communicating unit 101 notice of the option channel scan. In addition, the scan control unit 121 decreases the RSSI threshold from the "detection 1" threshold to the "detection 2" threshold. As in step S113 above, the wireless communicating unit 101 runs a scan without setting limitations on channels to be scanned but limiting the search only to access points with "ESSID_00". The wireless communicating unit 101 receives a probe response from the access point 11 on the channel CH1. On the other hand, because probe requests did not reach the access points 12 and 13, the wireless communicating unit 101 receive no probe responses from the access points 12 and 13 (S152).

Assume here that the RSSI of the access point 11 is RSSI_15. The wireless communicating unit 101 extracts the access point 11 whose RSSI is equal to or greater than the "detection 2" threshold and notifies the scan control unit 121 of the results of the option channel scan. The scan control unit 121 notifies the access point managing unit 122 of the results of the option channel scan. Because no access point with the RSSI equal to or greater than the "connection" threshold has been detected, the access point managing unit 122 waits for 20 seconds after giving the notice in step S151, and then gives the scan control unit 121 notice of an option channel scan again (S153).

From this point forward, the wireless communicating unit 101 runs an option channel scan in a similar fashion (S154). Because the measured RSSI is below the "connection" threshold, the access point managing unit 122 waits for 20 seconds after the previous notice and then gives the scan control unit 121 notice of an option channel scan again (S155). The wireless communicating unit 101 runs the option channel scan (S156). Because the measured RSSI is below the "connection" threshold, the access point managing unit 122 waits for 20 seconds after the previous notice and then gives the scan control unit 121 notice of an option channel scan again (S157). The wireless communicating unit 101 runs the option channel scan (S158).

The access point managing unit 122 confirms that the measured RSSI is below the "connection" threshold. In addition, the access point managing unit 122 also confirms that the mobile communication device 100 is still out of range after the four option channel scans following the mobile communication device 100 having moved out of range. Then, the access point managing unit 122 gives the scan control unit 121 notice of a normal scan in place of an option channel scan (S159). The scan control unit 121 gives the wireless communicating unit 101 notice of the normal scan. Herewith, a scan for access points is run on all channels without limiting the search to a specific ESSID. The cycle of a normal scan when the mobile communication device 100 is out of range may be set longer than the cycle of an option channel scan.

Figure 16:
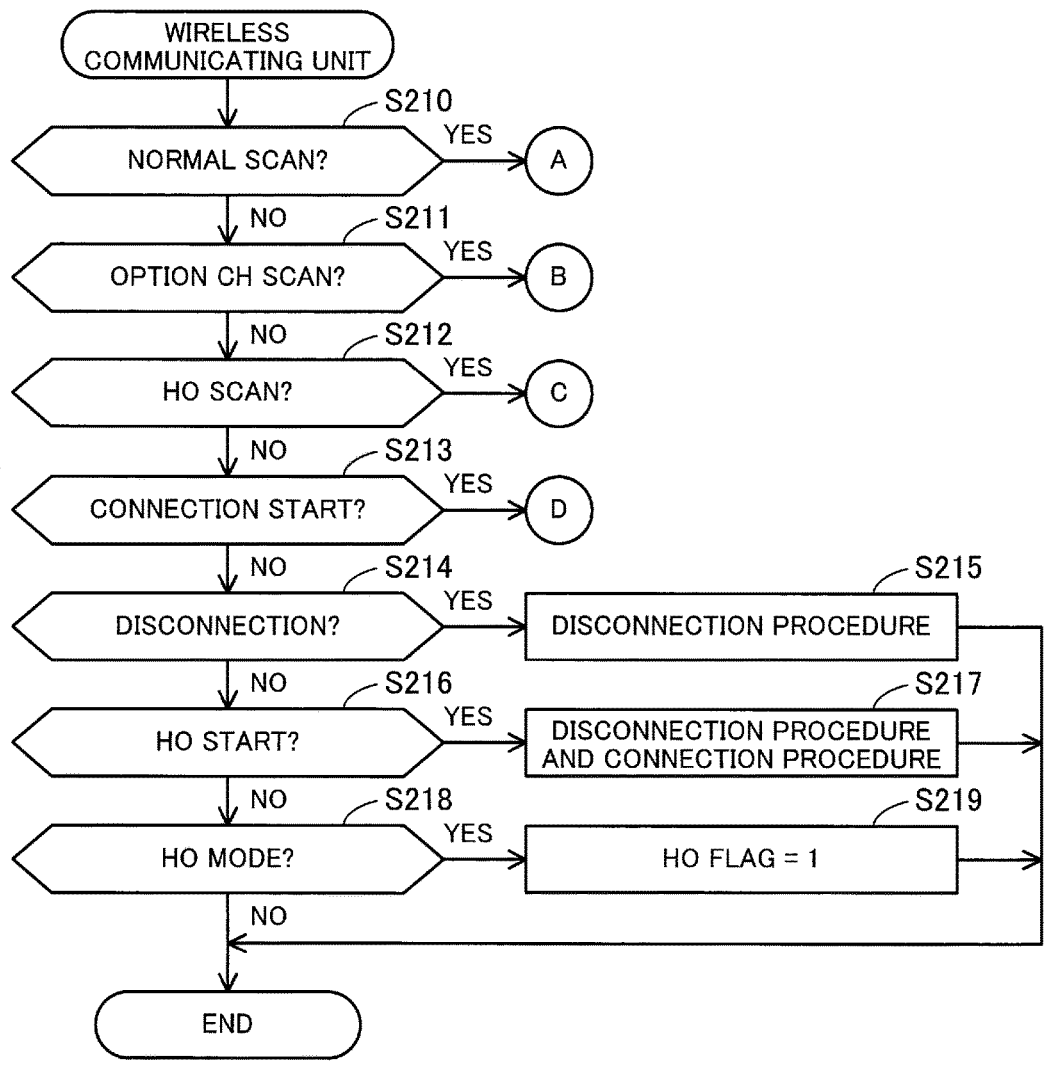
FIG. 16 is a flowchart illustrating a procedure example of a wireless communicating unit.

FIG. 16 is a flowchart illustrating a procedure example of the wireless communicating unit.

(S210) The wireless communicating unit 101 receives notice from the scan control unit 121, the access point managing unit 122, or the handover control unit 123. The wireless communicating unit 101 determines whether the received notice is normal scan notice sent from the scan control unit 121. If it is normal scan notice, the procedure moves to step S220. If not, the procedure moves to step S211.

(S211) The wireless communicating unit 101 determines whether the received notice is option channel scan notice sent from the scan control unit 121. If it is option channel scan notice, the procedure moves to step S230. If not, the procedure moves to step S212.

(S212) The wireless communicating unit 101 determines whether the received notice is handover scan notice sent from the scan control unit 121. If it is handover scan notice, the procedure moves to step S250. If not, the procedure moves to step S213.

(S213) The wireless communicating unit 101 determines whether the received notice is connection start notice sent from the access point managing unit 122. If it is connection start notice, the procedure moves to step S280. If not, the procedure moves to step S214.

(S214) The wireless communicating unit 101 determines whether the received notice is disconnection notice sent from the access point managing unit 122. If it is disconnection notice, the procedure moves to step S215. If not, the procedure moves to step S216.

(S215) The wireless communicating unit 101 performs a disconnection procedure with a currently connected access point. Then, the procedure of the wireless communicating unit 101 ends.

(S216) The wireless communicating unit 101 determines whether the received notice is handover start notice sent from the handover control unit 123. If it is handover start notice, the procedure moves to step S217. If not, the procedure moves to step S218.

(S217) The wireless communicating unit 101 performs a disconnection procedure with a currently connected access point. In addition, the wireless communicating unit 101 performs a connection procedure with an access point designated by the handover control unit 123. Then, the procedure of the wireless communicating unit 101 ends.

(S218) The wireless communicating unit 101 determines whether the received notice is handover mode notice sent from the handover control unit 123. If it is handover mode notice, the procedure moves to step S219. If not, the procedure of the wireless communicating unit 101 ends.

(S219) The wireless communicating unit 101 sets a handover flag to 1.

Figure 17:
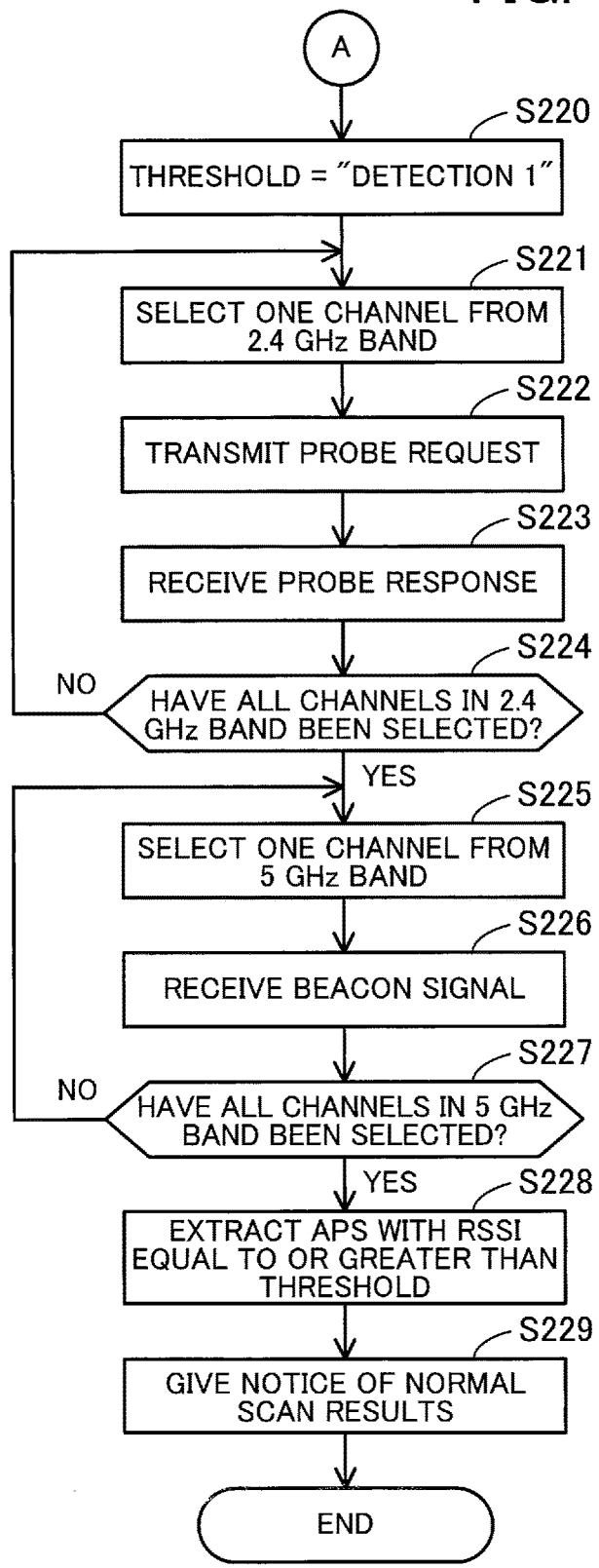
FIG. 17 is a flowchart illustrating the procedure example of the wireless communicating unit, continued from FIG. 16 (first continued flowchart)

FIG. 17 is a flowchart illustrating the procedure example of the wireless communicating unit, continued from FIG. 16 (first continued flowchart).

(S220) The wireless communicating unit 101 sets a detection reference to the "detection 1" threshold.

(S221) The wireless communicating unit 101 selects one channel from the 2.4 GHz band. The 2.4 GHz band includes channels CH1, CH2, CH3, CH4, CH5, CH6, CH7, CH8, CH9, CH10, CH11, CH12, and CH13.

(S222) The wireless communicating unit 101 transmits a probe request without designating an ESSID to be detected, on the channel selected in step S221. This transmission corresponds to a broadcast scan.

(S223) The wireless communicating unit 101 receives a probe response corresponding to the probe request transmitted in step S222. The probe response includes the BSSID and the ESSID of a transmission-source access point. Note here that the wireless communicating unit 101 may receive a probe response from one or more access points with any ESSIDs. On the other hand, the wireless communicating unit 101 may receive no probe response after the probe request did not reach any access point. The wireless communicating unit 101 measures the RSSI based on each received signal including the probe response.

(S224) The wireless communicating unit 101 determines whether all the channels in the 2.4 GHz band have been selected in step S221. If all the channels have been selected, the procedure moves to step S225. If one or more channels remain unselected, the procedure moves to step S221.

(S225) The wireless communicating unit 101 selects one channel from the 5 GHz band. The 5 GHz band includes the channels CH36, CH40, CH44, CH48, CH52, CH56, CH60, CH64, CH100, CH104, CH108, CH112, CH116, CH120, CH124, CH128, CH132, CH136, and CH140.

(S226) The wireless communicating unit 101 receives a beacon signal on the channel selected in step S225. If an access point is present near the mobile communication device 100, the wireless communicating unit 101 is able to receive a beacon signal once or twice from the access point by waiting for 120 milliseconds. The beacon signal includes the BSSID and ESSID of the transmission-source access point. In this regard, the wireless communicating unit 101 may receive a beacon signal from one or more access points with any ESSIDs. On the other hand, the wireless communicating unit 101 may receive no beacon signal. The wireless communicating unit 101 measures the RSSI based on each received signal including the beacon signal.

(S227) The wireless communicating unit 101 determines whether all the channels in the 5 GHz band have been selected in step S225. If all the channels have been selected, the procedure moves to step S228. If one or more channels remain unselected, the procedure moves to step S225.

(S228) The wireless communicating unit 101 extracts one or more access points each of whose measured RSSI is equal to or greater than the "detection 1" threshold amongst the transmission sources of the probe responses received in step S223 and the transmission sources of the beacon signals received in step S226.

(S229) The wireless communicating unit 101 notifies the scan control unit 121 of the results of the normal scan. The normal scan results include the BSSID, ESSID, channel, and RSSI of each of the access points extracted in step S228.

Figure 18:
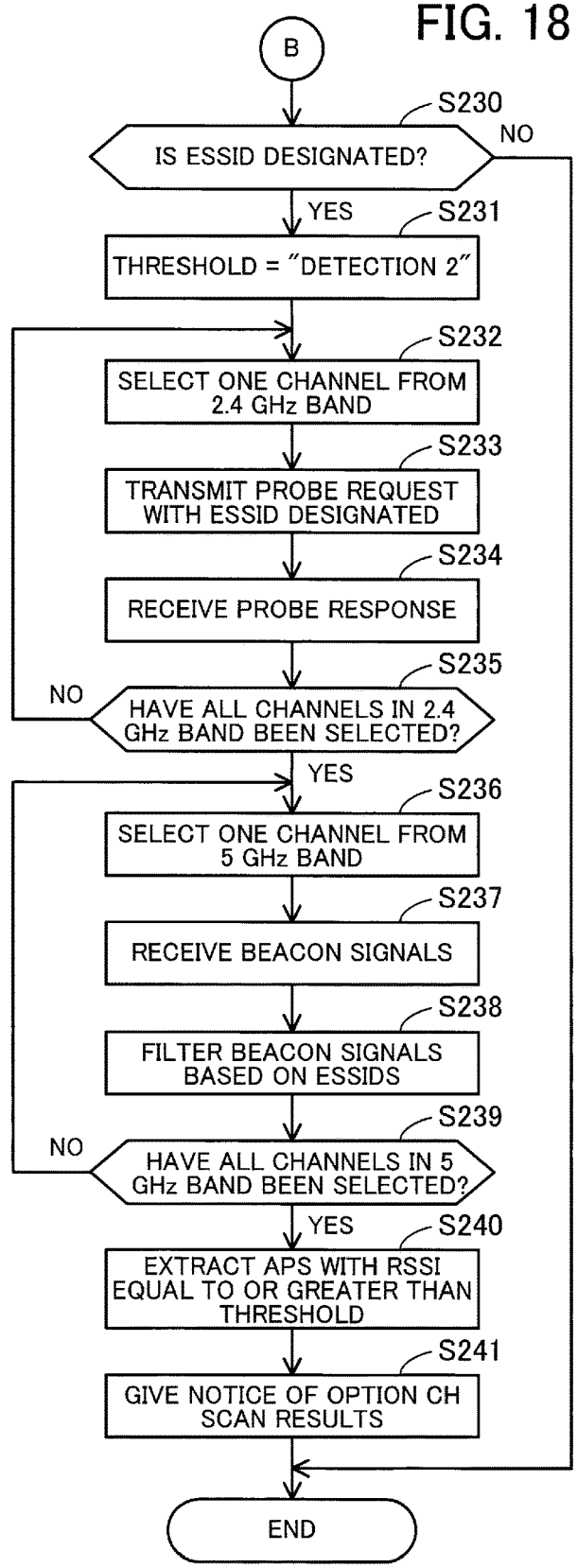
FIG. 18 is a flowchart illustrating the procedure example of the wireless communicating unit, continued from FIG. 16 (second continued flowchart)

FIG. 18 is a flowchart illustrating the procedure example of the wireless communicating unit, continued from FIG. 16 (second continued flowchart).

(S230) The wireless communicating unit 101 determines whether an ESSID is designated in the option channel scan notice. If an ESSID is designated, the procedure moves to step S231. If not, the procedure of the wireless communicating unit 101 ends.

(S231) The wireless communicating unit 101 sets a detection reference to the "detection 2" threshold.

(S232) The wireless communicating unit 101 selects one channel from the 2.4 GHz band.

(S233) The wireless communicating unit 101 transmits a probe request designating the ESSID on the channel selected in step S232. This transmission corresponds to a unicast scan.

(S234) The wireless communicating unit 101 receives a probe response corresponding to the probe request transmitted in step S233. Note that the wireless communicating unit 101 receives a probe response only from each access point with the designated ESSID. Note however that the wireless communicating unit 101 may receive no probe response. The wireless communicating unit 101 measures the RSSI based on each received signal including the probe response.

(S235) The wireless communicating unit 101 determines whether all the channels in the 2.4 GHz band have been selected in step S232. If all the channels have been selected, the procedure moves to step S236. If one or more channels remain unselected, the procedure moves to step S232.

(S236) The wireless communicating unit 101 selects one channel from the 5 GHz band.

(S237) The wireless communicating unit 101 receives a beacon signal on the channel selected in step S236. In this regard, the wireless communicating unit 101 may receive a beacon signal from one or more access points with any ESSIDs. On the other hand, the wireless communicating unit 101 may receive no beacon signal. The wireless communicating unit 101 measures the RSSI based on each received signal including the beacon signal.

(S238) The wireless communicating unit 101 filters the beacon signals received in step S237 based on their ESSIDs. That is, the wireless communicating unit 101 extracts one or more beacon signals each including the designated ESSID and discards the remaining beacon signals.

(S239) The wireless communicating unit 101 determines whether all the channels in the 5 GHz band have been selected in step S236. If all the channels have been selected, the procedure moves to step S240. If one or more channels remain unselected, the procedure moves to step S236.

(S240) The wireless communicating unit 101 extracts one or more access points each of whose measured RSSI is equal to or greater than the "detection 2" threshold amongst the transmission sources of the probe responses received in step S234 and the transmission sources of the beacon signals extracted in step S238.

(S241) The wireless communicating unit 101 notifies the scan control unit 121 of the results of the option channel scan. The option channel scan results include the BSSID, ESSID, channel, and RSSI of each of the access points extracted in step S240.

Figure 19:
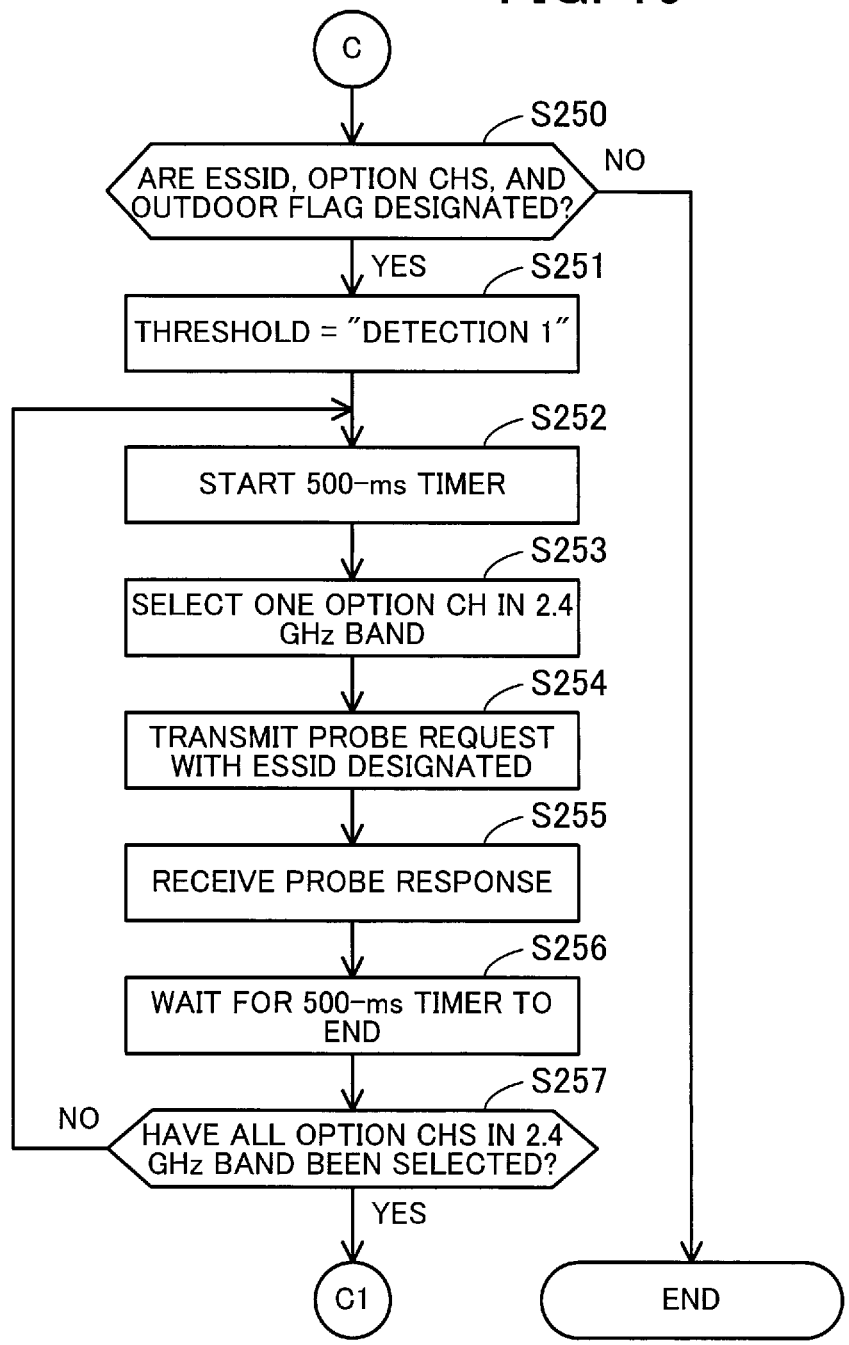
FIG. 19 is a flowchart illustrating the procedure example of the wireless communicating unit, continued from FIG. 16 (third continued flowchart)

FIG. 19 is a flowchart illustrating the procedure example of the wireless communicating unit, continued from FIG. 16 (third continued flowchart).

(S250) The wireless communicating unit 101 determines whether an ESSID, one or more option channels, and an outdoor flag are designated in the handover scan notice. If these items are designated, the procedure moves to step S251. If not, the procedure of the wireless communicating unit 101 ends.

(S251) The wireless communicating unit 101 sets a detection reference to the "detection 1" threshold.

(S252) The wireless communicating unit 101 starts a 500-millisecond timer. For the timer management, hardware of the wireless communicating unit 101, or hardware or software external to the wireless communicating unit 101 (for example, the timer managing unit 124), may be used.

(S253) The wireless communicating unit 101 selects, amongst the option channels designated in the handover scan notice, one option channel belonging to the 2.4 GHz band.

(S254) The wireless communicating unit 101 transmits a probe request designating the ESSID on the option channel selected in step S253. This transmission corresponds to a unicast scan.

(S255) The wireless communicating unit 101 receives a probe response corresponding to the probe request transmitted in step S254. Note that the wireless communicating unit 101 receives a probe response only from each access point with the designated ESSID. Note however that the wireless communicating unit 101 may receive no probe response. The wireless communicating unit 101 measures the RSSI based on each received signal including the probe response.

(S256) The wireless communicating unit 101 waits for the 500-millisecond timer to end.

(S257) The wireless communicating unit 101 determines whether all the option channels in the 2.4 GHz band have been selected in step S253. If all the option channels have been selected, the procedure moves to step S258. If one or more channels remain unselected, the procedure moves to step S252.

Figure 20:
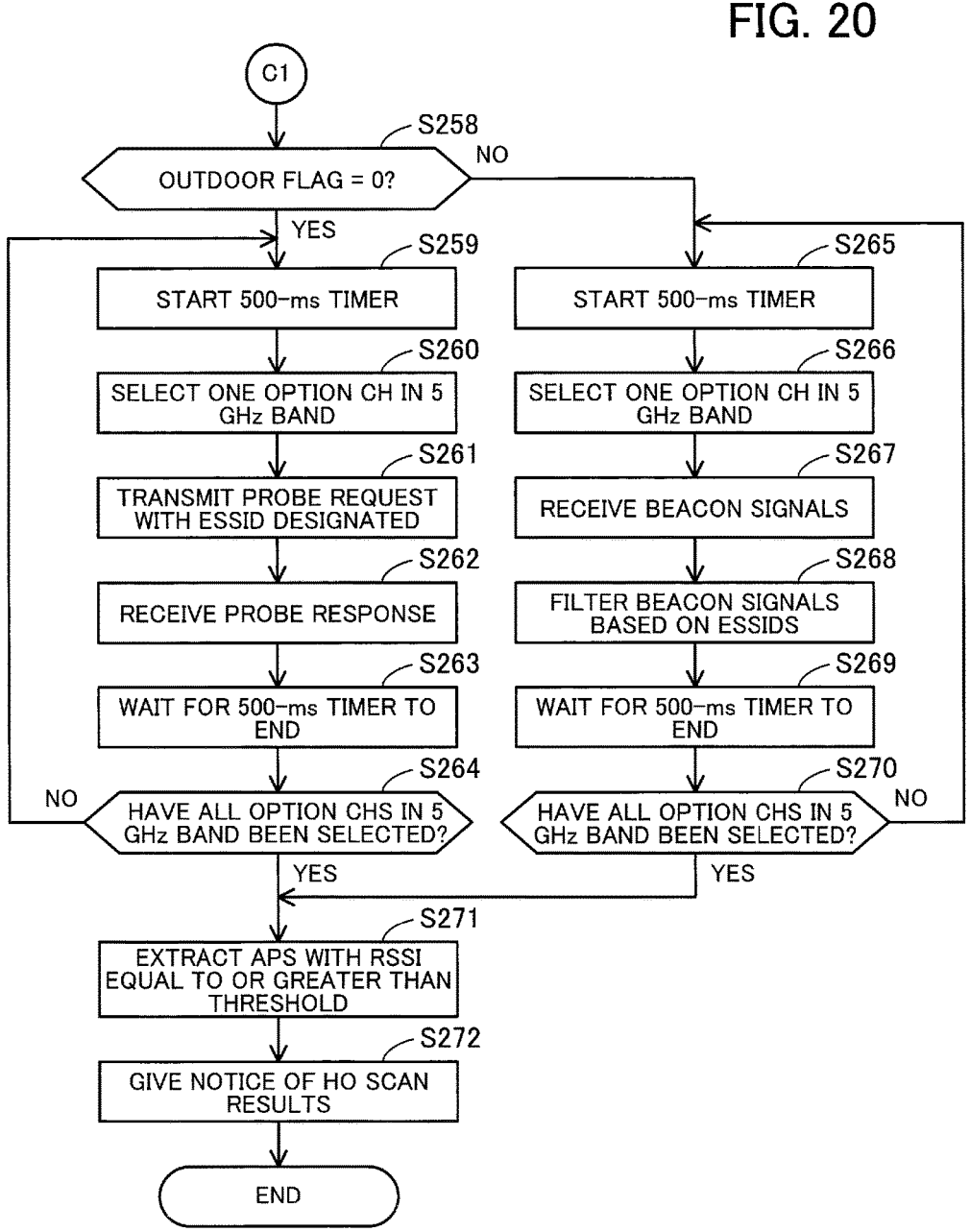
FIG. 20 is a flowchart illustrating the procedure example of the wireless communicating unit, continued from FIG. 19 (fourth continued flowchart)

FIG. 20 is a flowchart illustrating the procedure example of the wireless communicating unit, continued from FIG. 19 (fourth continued flowchart).

(S258) The wireless communicating unit 101 determines whether the outdoor flag is set to 0, that is, whether the current location is assumed to be indoor. If the outdoor flag is set to 0 (indoor), the procedure moves to step S259. If the outdoor flag is set to 1 (outdoor), the procedure moves to step S265.

(S259) The wireless communicating unit 101 starts a 500-millisecond timer.

(S260) The wireless communicating unit 101 selects, amongst the option channels designated in the handover scan notice, one option channel belonging to the GHz band.

(S261) The wireless communicating unit 101 transmits a probe request designating the ESSID on the option channel selected in step S260. That is, the wireless communicating unit 101 runs active and unicast scanning on the option channel in the 5 GHz band.

(S262) The wireless communicating unit 101 receives a probe response corresponding to the probe request transmitted in step S261. Note that the wireless communicating unit 101 receives a probe response only from each access point with the designated ESSID. Note however that the wireless communicating unit 101 may receive no probe response. The wireless communicating unit 101 measures the RSSI based on each received signal including the probe response.

(S263) The wireless communicating unit 101 waits for the 500-millisecond timer to end.

(S264) The wireless communicating unit 101 determines whether all the option channels in the 5 GHz band have been selected in step S260. If all the option channels have been selected, the procedure moves to step S271. If one or more channels remain unselected, the procedure moves to step S259.

(S265) The wireless communicating unit 101 starts a 500-millisecond timer.

(S266) The wireless communicating unit 101 selects, amongst the option channels designated in the handover scan notice, one option channel belonging to the GHz band.

(S267) The wireless communicating unit 101 receives a beacon signal on the channel selected in step S266. In this regard, the wireless communicating unit 101 may receive a beacon signal from one or more access points with any ESSIDs. Note however that the wireless communicating unit 101 may receive no beacon signal. The wireless communicating unit 101 measures the RSSI based on each received signal including the beacon signal.

(S268) The wireless communicating unit 101 filters the beacon signals received in step S267 based on their ESSIDs. That is, the wireless communicating unit 101 extracts one or more beacon signals each including the designated ESSID and discards the remaining beacon signals.

(S269) The wireless communicating unit 101 waits for the 500-millisecond timer to end.

(S270) The wireless communicating unit 101 determines whether all the option channels in the 5 GHz band have been selected in step S266. If all the option channels have been selected, the procedure moves to step S271. If one or more channels remain unselected, the procedure moves to step S265.

(S271) The wireless communicating unit 101 extracts one or more access points each of whose measured RSSI is equal to or greater than the "detection 1" threshold amongst the transmission sources of the probe responses received in steps S255 and S262 and the transmission sources of the beacon signals extracted in step S268.

(S272) The wireless communicating unit 101 notifies the scan control unit 121 of the results of the handover scan. The handover scan results include the BSSID, ESSID, channel, and RSSI of each of the access points extracted in step S271.

Figure 21:
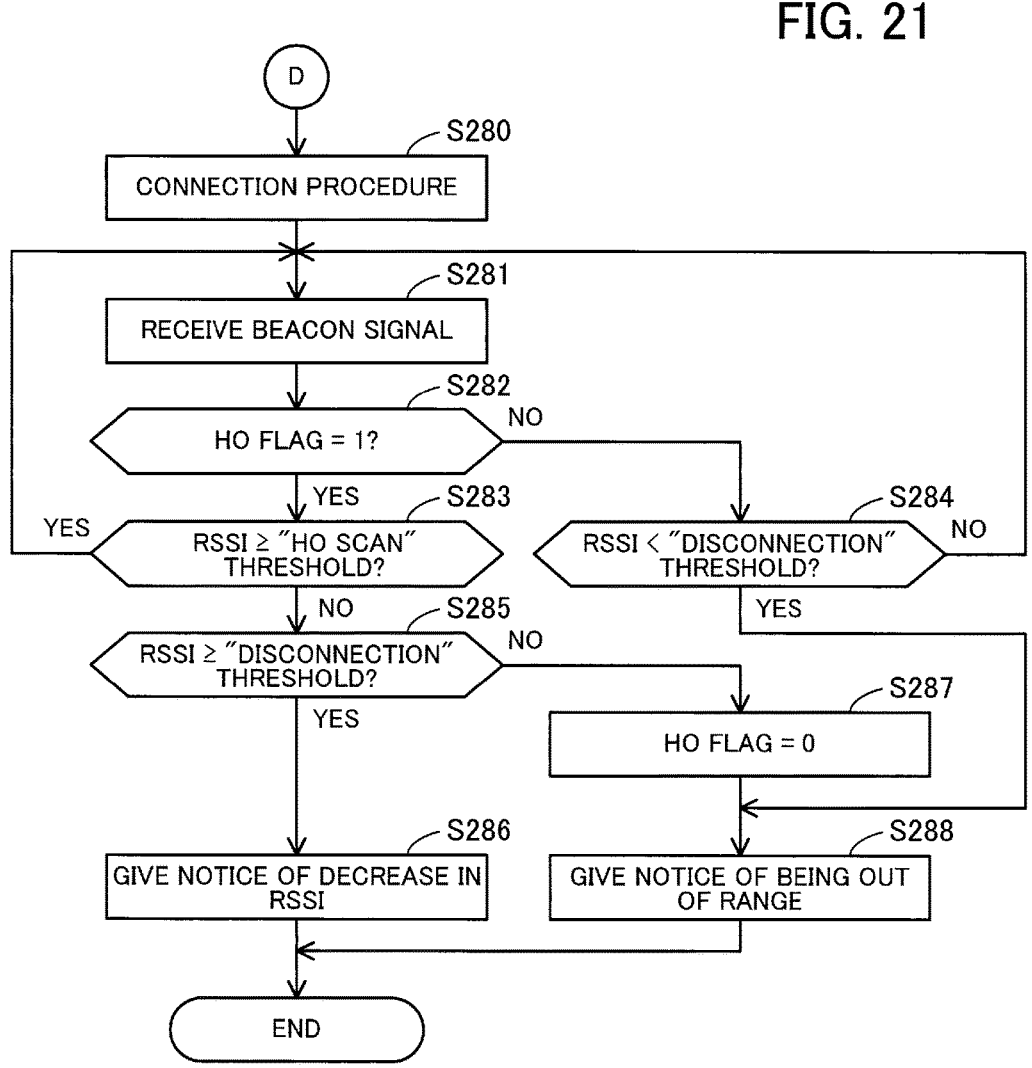
FIG. 21 is a flowchart illustrating the procedure example of the wireless communicating unit, continued from FIG. 16 (fifth continued flowchart)

FIG. 21 is a flowchart illustrating the procedure example of the wireless communicating unit, continued from FIG. 16 (fifth continued flowchart).

(S280) The wireless communicating unit 101 performs a connection procedure with an access point designated by the access point managing unit 122 in the connection start notice.

(S281) The wireless communicating unit 101 receives a beacon signal from the connected access point. The beacon signal is transmitted with a predetermined period of time (for example, at intervals of about 100 milliseconds). The wireless communicating unit 101 measures the RSSI based on a received signal including the beacon signal.

(S282) The wireless communicating unit 101 determines whether the handover flag is set to 1. If the handover flag is set to 1, the procedure moves to step S283. If the handover flag is set to 0, the procedure moves to step S284. The handover flag indicates the result of determination of whether a handover environment has been established. The handover flag is set to 1 in step S219 above and set to 0 in step S287 to be described below.

(S283) The wireless communicating unit 101 determines whether the RSSI measured in step S281 is equal to or greater than the "handover scan" threshold. If it is equal to or greater than the "handover scan" threshold, the procedure moves to step S281. If not, the procedure moves to step S285.

(S284) The wireless communicating unit 101 determines whether the RSSI measured in step S281 is below the "disconnection" threshold. If it is below the "disconnection" threshold, the procedure moves to step S288. If not, the procedure moves to step S281.

(S285) The wireless communicating unit 101 determines whether the RSSI measured in step S281 is equal to or greater than the "disconnection" threshold. If it is equal to or greater than the "disconnection" threshold, the procedure moves to step S286. If not, the procedure moves to step S287.

(S286) The wireless communicating unit 101 notifies the scan control unit 121 of a decrease in the RSSI. The RSSI decrease notice includes the BSSID, ESSID, channel number, and RSSI of the currently connected access point. Then, the procedure of the wireless communicating unit 101 ends.

(S287) The wireless communicating unit 101 sets the handover flag to 0.

(S288) The wireless communicating unit 101 gives the scan control unit 121 notice of being out of range.

Figure 22:
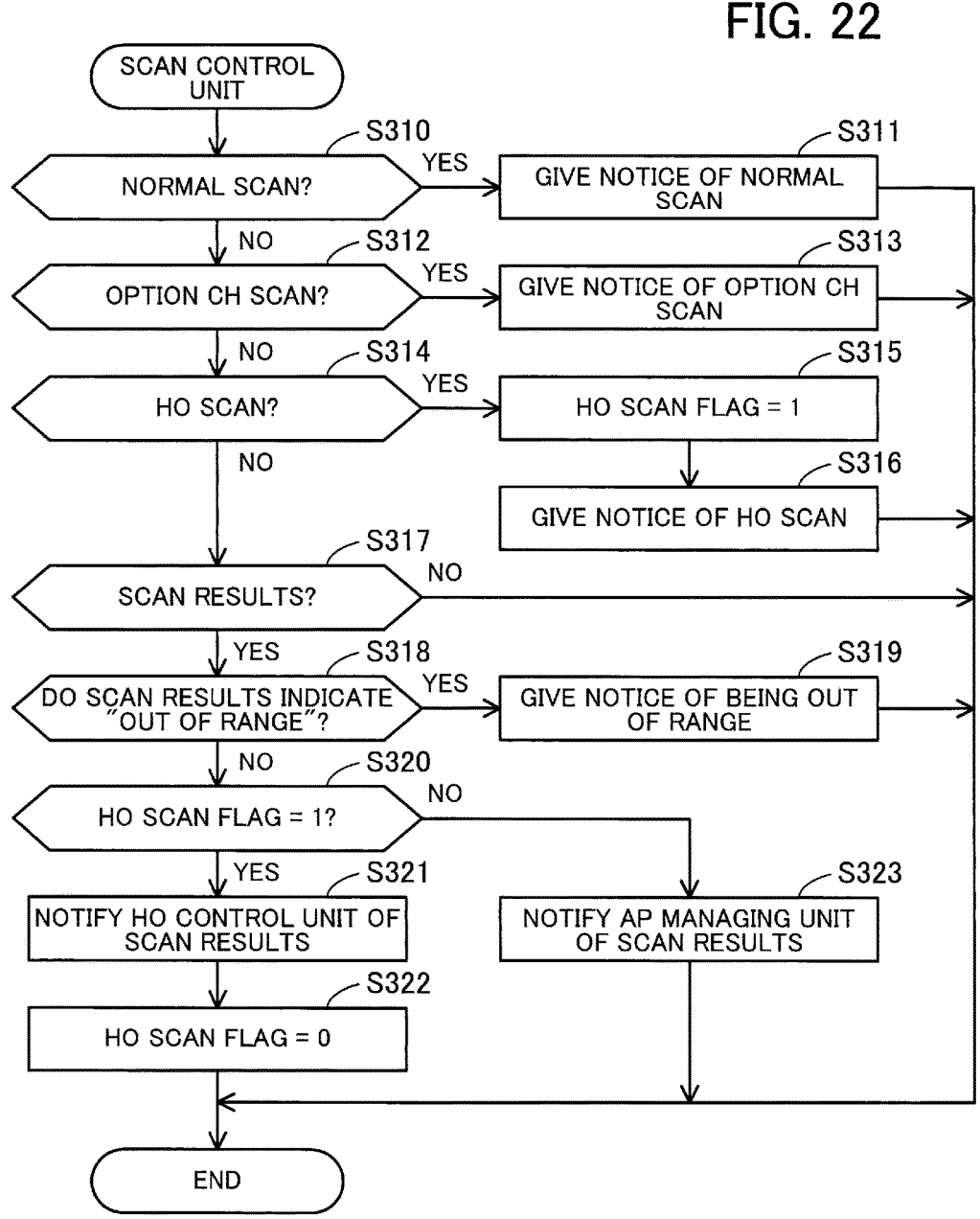
FIG. 22 is a flowchart illustrating a procedure example of a scan control unit.

FIG. 22 is a flowchart illustrating a procedure example of the scan control unit.

(S310) The scan control unit 121 receives notice from the wireless communicating unit 101, the access point managing unit 122, or the handover control unit 123. The scan control unit 121 determines whether the received notice is normal scan notice sent from the access point managing unit 122. If it is normal scan notice, the procedure moves to step S311. If not, the procedure moves to step S312.

(S311) The scan control unit 121 gives the wireless communicating unit 101 notice of the normal scan. Then, the procedure of the scan control unit 121 ends.

(S312) The scan control unit 121 determines whether the received notice is option channel scan notice sent from the access point managing unit 122. If it is option channel scan notice, the procedure moves to step S313. If not, the procedure moves to step S314.

(S313) The scan control unit 121 gives the wireless communicating unit 101 notice of the option channel scan. Then, the procedure of the scan control unit 121 ends.

(S314) The scan control unit 121 determines whether the received notice is handover scan notice sent from the handover control unit 123. If it is handover scan notice, the procedure moves to step S315. If not, the procedure moves to step S317.

(S315) The scan control unit 121 sets a handover scan flag to 1.

(S316) The scan control unit 121 gives the wireless communicating unit 101 notice of the handover scan. Then, the procedure of the scan control unit 121 ends.

(S317) The scan control unit 121 determines whether the received notice is notice of scan results sent from the wireless communicating unit 101. The scan results is one of normal scan results, option channel scan results, and handover scan results. If it is notice of scan results, the procedure moves to step S318. If not, the procedure of the scan control unit 121 ends.

(S318) The scan control unit 121 determines whether the scan results indicate that the mobile communication device 100 is out of range. If the results indicate that the mobile communication device 100 is out of range, the procedure moves to step S319. If not, the procedure moves to step S320.

(S319) The scan control unit 121 gives the access point managing unit 122 notice of being out of range. Then, the procedure of the scan control unit 121 ends.

(S320) The scan control unit 121 determines whether the handover scan flag is set to 1. If the handover scan flag is set to 1, the procedure moves to step S321. If the handover scan flag is set to 0, the procedure moves to step S323. The handover scan flag indicates whether a handover scan is in progress. The handover scan flag is set to 1 in step S315 and set to 0 in step S322 to be described below.

(S321) The scan control unit 121 notifies the handover control unit 123 of the scan results. The scan results here are handover scan results.

(S322) The scan control unit 121 sets the handover scan flag to 0. Then, the procedure of the scan control unit 121 ends.

(S323) The scan control unit 121 notifies the access point managing unit 122 of the scan results. The scan results here are normal scan results or option channel scan results.

Figure 23:
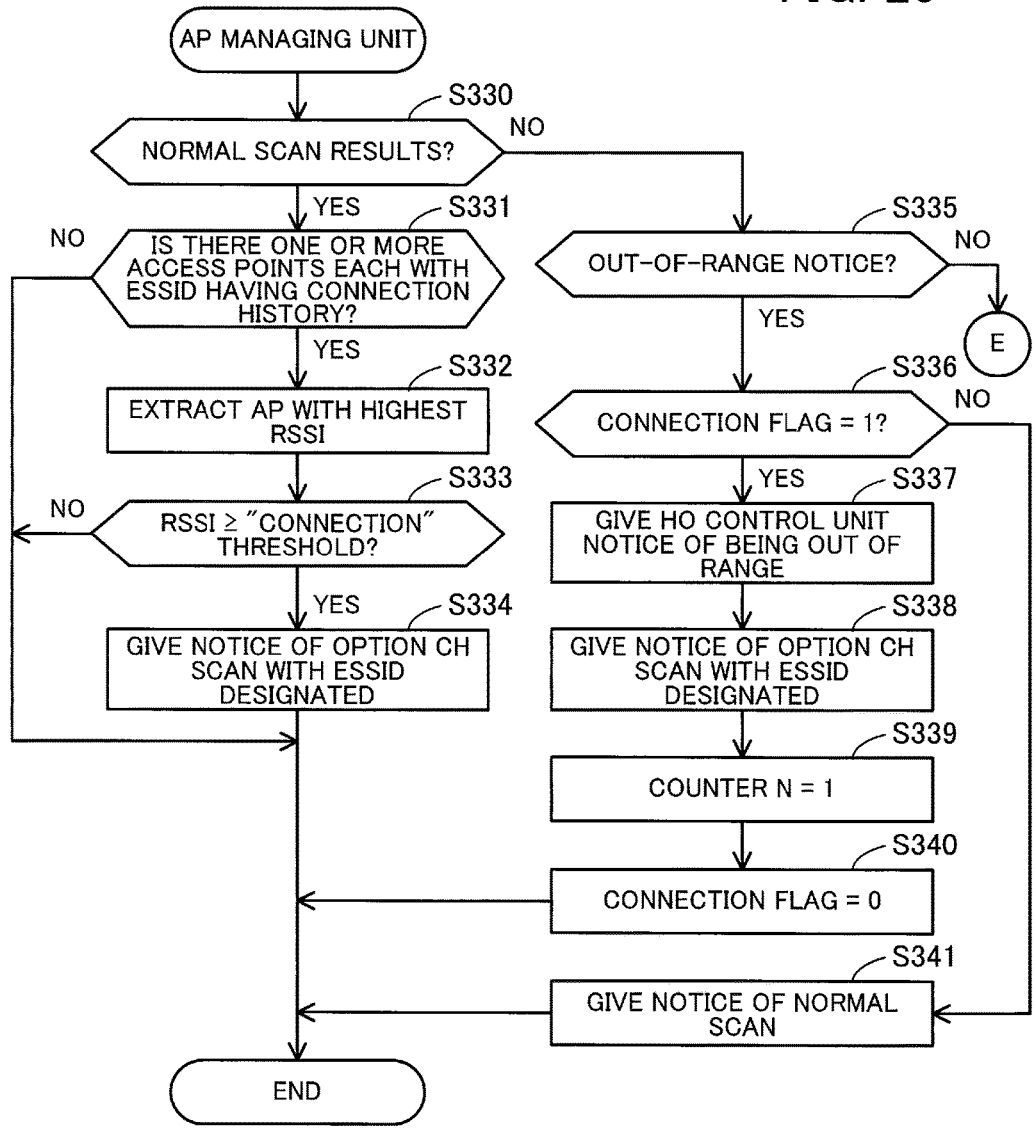
FIG. 23 is a flowchart illustrating a procedure example of an access point managing unit.

FIG. 23 is a flowchart illustrating a procedure example of the access point managing unit.

(S330) The access point managing unit 122 receives notice from the scan control unit 121 or the screen control unit 125. The access point managing unit 122 determines whether the received notice is notice of normal scan results sent from the scan control unit 121. If it is normal scan result notice, the procedure moves to step S331. If not, the procedure moves to step S335.

(S331) The access point managing unit 122 extracts, from the normal scan results, one or more access points each with an ESSID having a connection history, that is, one or more access points each of whose ESSID is registered in the connection record table 111. The access point managing unit 122 determines whether one or more such access points are present. If one or more such access points are present, the procedure moves to step S332. If not, the procedure of the access point managing unit 122 ends.

(S332) The access point managing unit 122 extracts, from the access points extracted in step S331, one with the highest RSSI.

(S333) The access point managing unit 122 determines whether the RSSI of the access point extracted in step S332 is equal to or greater than the "connection" threshold. If it is equal to or greater than the "connection" threshold, the procedure moves to step S334. If not, the procedure of the access point managing unit 122 ends.

(S334) The access point managing unit 122 determines the access point extracted in step S332 as a connection destination. Then, the access point managing unit 122 gives the scan control unit 121 notice of an option channel scan. In this regard, the access point managing unit 122 designates the ESSID of the determined connection-destination access point. Subsequently, the procedure of the access point managing unit 122 ends.

(S335) The access point managing unit 122 determines whether the received notice is out-of-range notice sent from the scan control unit 121. If it is out-of-range notice, the procedure moves to step S336. If not, the procedure moves to step S342.

(S336) The access point managing unit 122 determines whether a connection flag is set to 1. If the connection flag is set to 1, the procedure moves to step 6337. If the connection flag is set to 0, the procedure moves to step 6341. The connection flag indicates whether the mobile communication device 100 is currently connected to an access point. The connection flag is set to 1 in step S347 to be described later and set to 0 in step S340 to be described below.

(S337) The access point managing unit 122 gives the handover control unit 123 notice of being out of range.

(S338) The access point managing unit 122 gives the scan control unit 121 notice of an option channel scan. In this regard, the access point managing unit 122 designates the ESSID of an access point to which the mobile communication device 100 was connected just before going out of range.

(S339) The access point managing unit 122 sets a counter N to 1.

(S340) The access point managing unit 122 sets the connection flag to 0. Then, the procedure of the access point managing unit 122 ends.

(S341) The access point managing unit 122 gives the scan control unit 121 notice of a normal scan.

Figure 24:
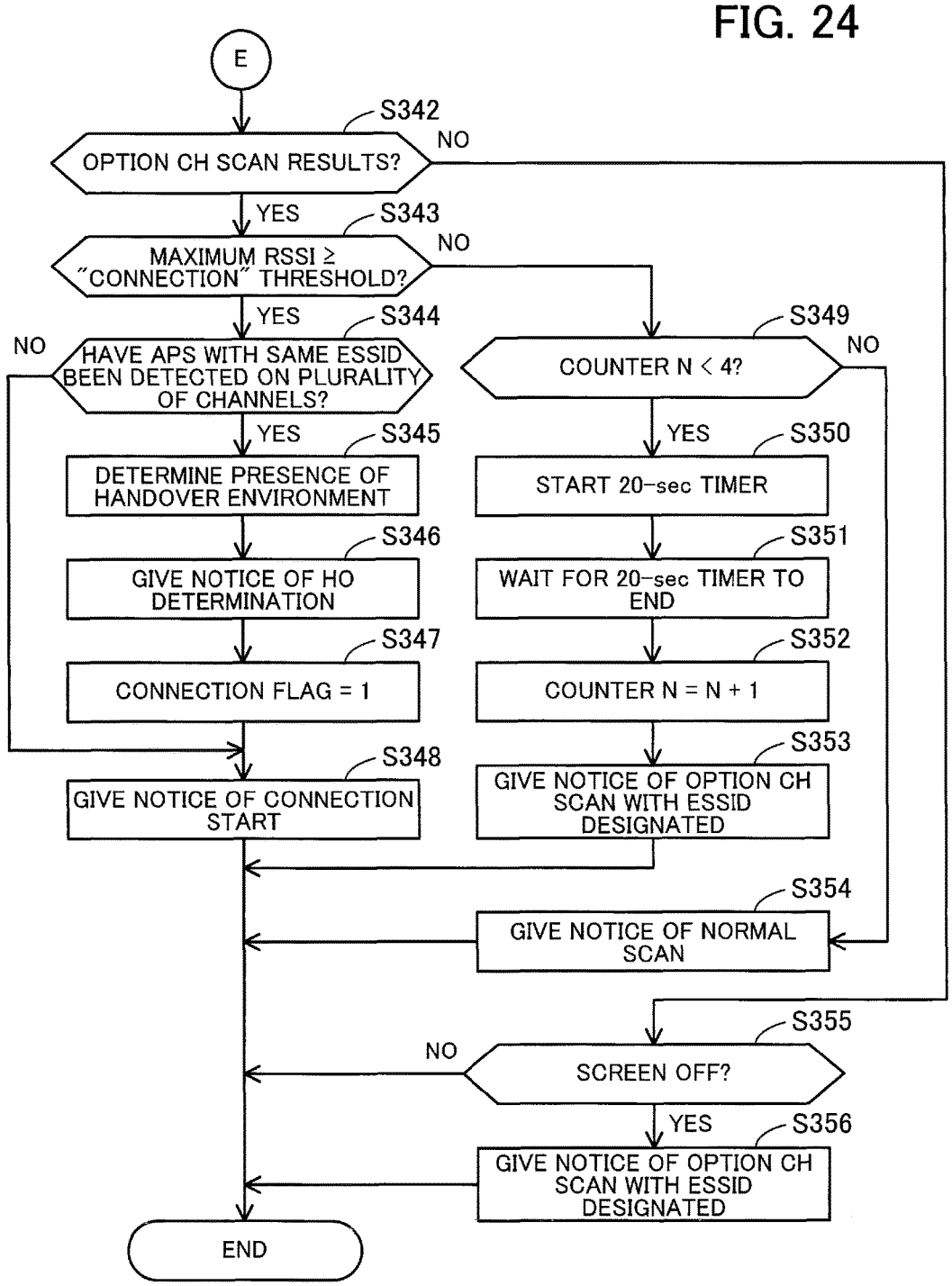
FIG. 24 is a flowchart illustrating the procedure example of the access point managing unit, continued from FIG. 23.

FIG. 24 is a flowchart illustrating the procedure example of the access point managing unit, continued from FIG. 23.

(S342) The access point managing unit 122 determines whether the received notice is notice of option channel scan results sent from the scan control unit 121. If it is notice of option channel scan results, the procedure moves to step S343. If not, the procedure moves to step S355.

(S343) The access point managing unit 122 extracts the highest RSSI (maximum RSSI) amongst RSSIs included in the option channel scan results. The access point managing unit 122 determines whether the maximum RSSI is equal to or greater than the "connection" threshold. If it is equal to or greater than the "connection" threshold, the procedure moves to step S344. If not, the procedure moves to step S349.

(S344) The access point managing unit 122 determines whether the option channel scan results include information of a plurality of access points. This is to determine whether access points with the same ESSID have been detected on a plurality of channels. If information of a plurality of access points is included, the procedure moves to step S345. If not, the procedure moves to step S348.

(S345) The access point managing unit 122 determines that a handover environment has been established.

(S346) The access point managing unit 122 notifies the handover control unit 123 of the handover determination.

(S347) The access point managing unit 122 sets the connection flag to 1.

(S348) The access point managing unit 122 notifies the wireless communicating unit 101 of a connection start. Then, the procedure of the access point managing unit 122 ends.

(S349) The access point managing unit 122 determines whether the value of the counter N is less than 4 (N<4). If N<4, the procedure moves to step S350. If not, the procedure moves to step S354. N is the number of times an option channel scan has been run in a row. N is reset to 1 in step S339 and increased by 1 in step S352 to be described below.

(S350) The access point managing unit 122 starts a 20-second timer.

(S351) The access point managing unit 122 waits for the 20-second timer to end.

(S352) The access point managing unit 122 increases the value of the counter N by 1.

(S353) The access point managing unit 122 gives the scan control unit 121 notice of an option channel scan. In this regard, the access point managing unit 122 designates the same ESSID as in the foregoing option channel scan. Then, the procedure of the access point managing unit 122 ends.

(S354) The access point managing unit 122 gives the scan control unit 121 notice of a normal scan. Then, the procedure of the access point managing unit 122 ends.

(S355) The access point managing unit 122 determines whether the received notice is notice of the screen being turned OFF sent from the screen control unit 125. If it is notice of the screen being turned OFF, the procedure moves to step S356. If not, the procedure of the access point managing unit 122 ends.

(S356) The access point managing unit 122 gives the scan control unit 121 notice of an option channel scan. In this regard, the access point managing unit 122 designates the ESSID of a currently connected access point.

Figure 25:
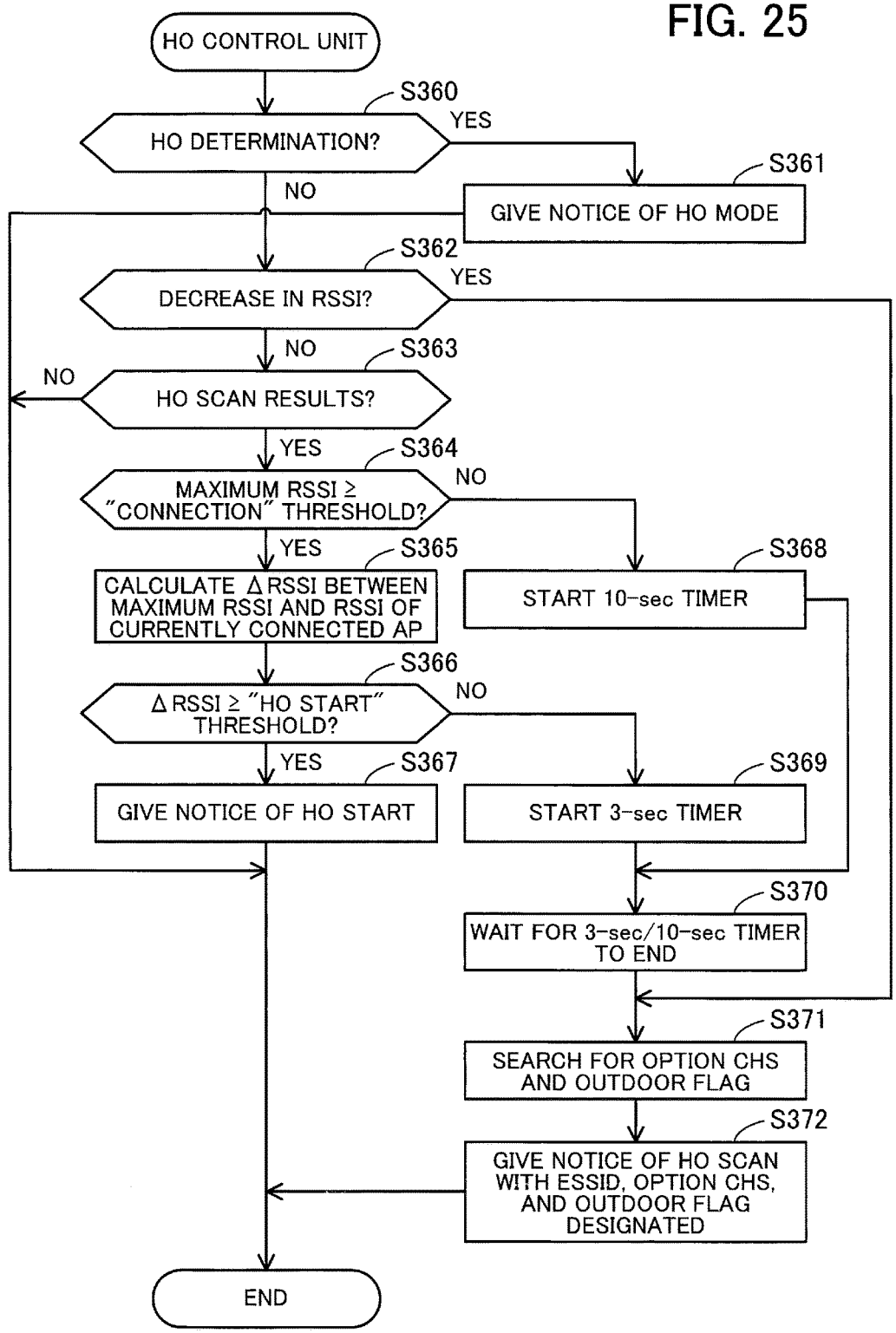
FIG. 25 is a flowchart illustrating a first procedure example of a handover control unit.

FIG. 25 is a flowchart illustrating a first procedure example of the handover control unit.

(S360) The handover control unit 123 receives notice from the scan control unit 121 or the access point managing unit 122. The handover control unit 123 determines whether the received notice is notice of handover determination sent from the access point managing unit 122. If it is handover determination notice, the procedure moves to step S361. If not, the procedure moves to step S362.

(S361) The handover control unit 123 gives the wireless communicating unit 101 notice of a handover mode. Herewith, the handover control unit 123 and the wireless communicating unit 101 start operations in anticipation of a handover. Then, the procedure of the handover control unit 123 ends.

(S362) The handover control unit 123 determines whether the received notice is notice of a decrease in the RSSI sent from the scan control unit 121. If it is RSSI decrease notice, the procedure moves to step S371. If not, the procedure moves to step S363.

(S363) The handover control unit 123 determines whether the received notice is notice of handover scan results sent from the scan control unit 121. If it is notice of handover scan results, the procedure moves to step S364. If not, the procedure of the handover control unit 123 ends.

(S364) The handover control unit 123 extracts the highest RSSI (maximum RSSI) amongst RSSIs included in the handover scan results. The handover control unit 123 determines whether the maximum RSSI is equal to or greater than the "connection" threshold. If it is equal to or greater than the "connection" threshold, the procedure moves to step S365. If not, the procedure moves to step S368.

(S365) The handover control unit 123 calculates the difference ($\Delta$RSSI) between the maximum RSSI and the RSSI of a currently connected access point included in the handover scan results.

(S366) The handover control unit 123 determines whether $\Delta$RSSI calculated in step S365 is equal to or greater than the "handover start" threshold. If it is equal to or greater than the "handover start" threshold, the procedure moves to step S367. If it is below the "handover start" threshold, the procedure moves to step S369.

(S367) The handover control unit 123 gives the wireless communicating unit 101 notice of a handover start. Then, the procedure of the handover control unit 123 ends.

(S368) The handover control unit 123 starts a 10-second timer. Then, the procedure moves to step S370.

(S369) The handover control unit 123 starts a 3-second timer.

(S370) The handover control unit 123 waits for the 10-second timer started in step S368 or the 3-second timer started in step S369 to end.

(S371) The handover control unit 123 searches the option channel table 113 for one or more option channels and the outdoor flag corresponding to the currently connected access point.

(S372) The handover control unit 123 gives the scan control unit 121 notice of a handover scan. In this regard, the handover control unit 123 designates the ESSID of the currently connected access point and the option channels and outdoor flag found in step S371. Note that the option channels designated in the handover scan include the channel on which the currently connected access point operates.

Thus, because a plurality of access points may be disposed relatively close to each other in a handover environment, a handover scan is initiated early on when the RSSI of the currently connected access point is yet higher than the "connection" threshold. Then, when a different access point whose RSSI is equal to or greater than the "connection" threshold is detected although it does not meet the handover condition, a handover scan is repeated over a short period of time (at intervals of 3 seconds in the above example). On the other hand, when a different access point whose RSSI is equal to or greater than the "connection" threshold is not detected, a handover scan is repeated over a long period of time (at intervals of 10 seconds in the above example).

Figure 26:
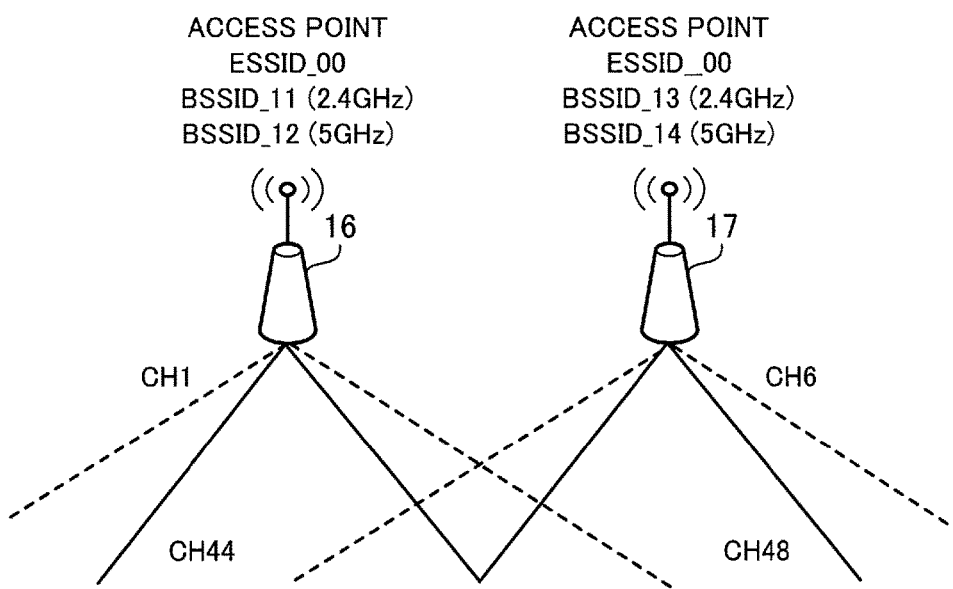
FIG. 26 illustrates an example of dual band access points.

Note that in the case where dual band access points each using both a 2.4-GHz band channel and a 5-GHz band channel are present, the presence/absence of a handover environment is determined in the following manner. FIG. 26 illustrates an example of dual band access points. Access points 16 and 17 are dual band access points each using both a 2.4-GHz band channel and a 5-GHz band channel. Each of the access points 16 and 17 has an ESSID of "ESSID_00". In the 2.4 GHz band, the access point 16 has a BSSID of "BSSID_11" and operates on the channel CH1. In the 5 GHz band, the access point 16 has a BSSID of "BSSID_12" and operates on the channel CH44. On the other hand, in the 2.4 GHz band, the access point 17 has a BSSID of "BSSID_13" and operates on the channel CH6. In the 5 GHz band, the access point 17 has a BSSID of "BSSID_14" and operates on the channel CH48.

In the case where such dual band access points are present, it is preferable that the mobile communication device 100 do not determine the presence of a handover environment based only on the fact that access points with the same ESSID have been detected on two or more channels. This is because, in reality, only one access point may have been detected and a different access points may not be present in its neighboring area. For example, even if having received a signal on the channel CH1 in the 2.4 GHz band and a signal on the channel CH44 in the 5 GHz band, the mobile communication device 100 may, in reality, have detected only the access point 16. Similarly, even if having received a signal on the channel CH6 in the 2.4 GHz band and a signal on the channel CH48 in the 5 GHz band, the mobile communication device 100 may, in reality, have detected only the access point 17.

In view of this, it is considered reasonable that the mobile communication device 100 determines that a handover environment has been established when access points with the same ESSID are detected on two or more channels in the same frequency band. For example, when having received signals including the same ESSID on the individual channels CH1 and CH6 in the 2.4 GHz band, the mobile communication device 100 determines that a handover environment has been established. Similarly, when having received signals including the same ESSID on the individual channels CH44 and CH48 in the 5 GHz band, the mobile communication device 100 determines that a handover environment has been established.

Note however that, when having detected access points with the same ESSID on three or more channels regardless of their frequency bands, the mobile communication device 100 may determine that a handover environment has been established. For example, when having received signals including the same ESSID on at least three of the individual channels CH1, CH6, CH44, and CH48, the mobile communication device 100 determines that a handover environment has been established.

According to the mobile communication system of the second embodiment, it is checked whether a plurality of access points with the same ESSID have been detected on different channels. Then, if this condition is satisfied, the presence of a handover environment in the place is determined. Then, when a handover environment is determined to have been established, a scanning operation in anticipation of a handover is initiated, which is different from when no handover environment is determined to have been established. For example, in the case where the RSSI has decreased, a handover scan is initiated early on based on the "handover scan" threshold higher than the "connection" threshold. In addition, when the mobile communication device 100 is out of range, a handover scan is run over a shorter period of time than for a normal scan.

Herewith, even if not knowing in advance individual access points belonging to the handover environment, the mobile communication device 100 is able to determine whether a handover is possible, based on scan results. Especially, even in the case where the same ESSID is assigned to a plurality of access points distant from each other and a handover environment is or is not present depending on the location, it is possible to determine, with accuracy, whether a handover environment is present at the current location. This allows a smooth handover between access points at a location where a handover environment has been established. In addition, at a place where no handover environment has been established, it is possible to control excessive scanning operations in anticipation of a handover. This reduces the load on the mobile communication device 100. For example, the power consumption of the mobile communication device 100 is reduced. Further, it is possible to mitigate the impact on the quality of data communication.

The "detection 2" threshold used in an option channel scan is set lower than the "detection 1" threshold used in a normal scan. This allows efficient scanning operations in view of the possibility that one or more connectable access point may appear later as the mobile communication device 100 moves. In addition, an option channel scan with designation of an ESSID is run before a connection to an access point, separately from a normal scan. This prevents aimed access points from failing to be detected even when a number of access points are present around the mobile communication device 100, thus improving the detection accuracy. In addition, an option channel scan is run when no data communication is likely to take place, for example, before the establishment of a connection to an access point or when the screen is turned OFF. This mitigates the impact on data communication.

A handover scan is run, setting limitations on channels to be scanned and an ESSID to be detected. When a 5-GHz band signal is received by an option channel scan, the current location is assumed to be indoor and, then, active scanning is run also on channels in the 5 GHz band. This shortens the actual time needed for the handover scan. In addition, in a handover scan, a search on a plurality of channels is run not continuously but intermittently and data communication is enabled while the scan is temporarily stopped. Herewith, even if a voice call is made on the mobile communication device 100 during a handover scan, it is possible to reduce the delay of voice packets, thus mitigating the impact on the sound quality.

In addition, when the mobile communication device 100 has moved out of the range of a currently connected access point, a short-period option channel scan is run in a handover environment. This may possibly allow a quick connection to a different access point. In the case where a different connectable access point is not detected after a predetermined number of option channel scans (or after a predetermined period of time has elapsed), the search method is switched to a normal scan, thus preventing unwanted scanning operations.

(c) Third Embodiment

A third embodiment is described next. While omitting repeated explanations, the following description focuses on differences from the second embodiment above.

A mobile communication system according to the third embodiment holds back from running a handover scan although the RSSI is below the "handover scan" threshold if an acceleration sensor detects a mobile communication device being stationary. Alternatively, if the mobile communication device is detected to be stationary, the mobile communication system of the third embodiment sets the cycle of a handover scan longer than when the mobile communication device is detected to be moving. Herewith, it is possible to reduce excessive handover scans in a situation where a different access point satisfying the handover condition is less likely to appear. For example, excess handover scans are reduced in a situation where no change is seen in the RSSI even though one or more different access points are detected. This situation is observed, for example, when the mobile communication device becomes stationary around a wireless area where a handover is possible or at the boundary between wireless areas of two access points.

The mobile communication system according to the third embodiment is implemented using the same configuration as the mobile communication system of the first embodiment illustrated in FIGS. 2, 3, and 8. The third embodiment is described below using the same reference numerals as those in FIGS. 2, 3, and 8.

Figure 27:
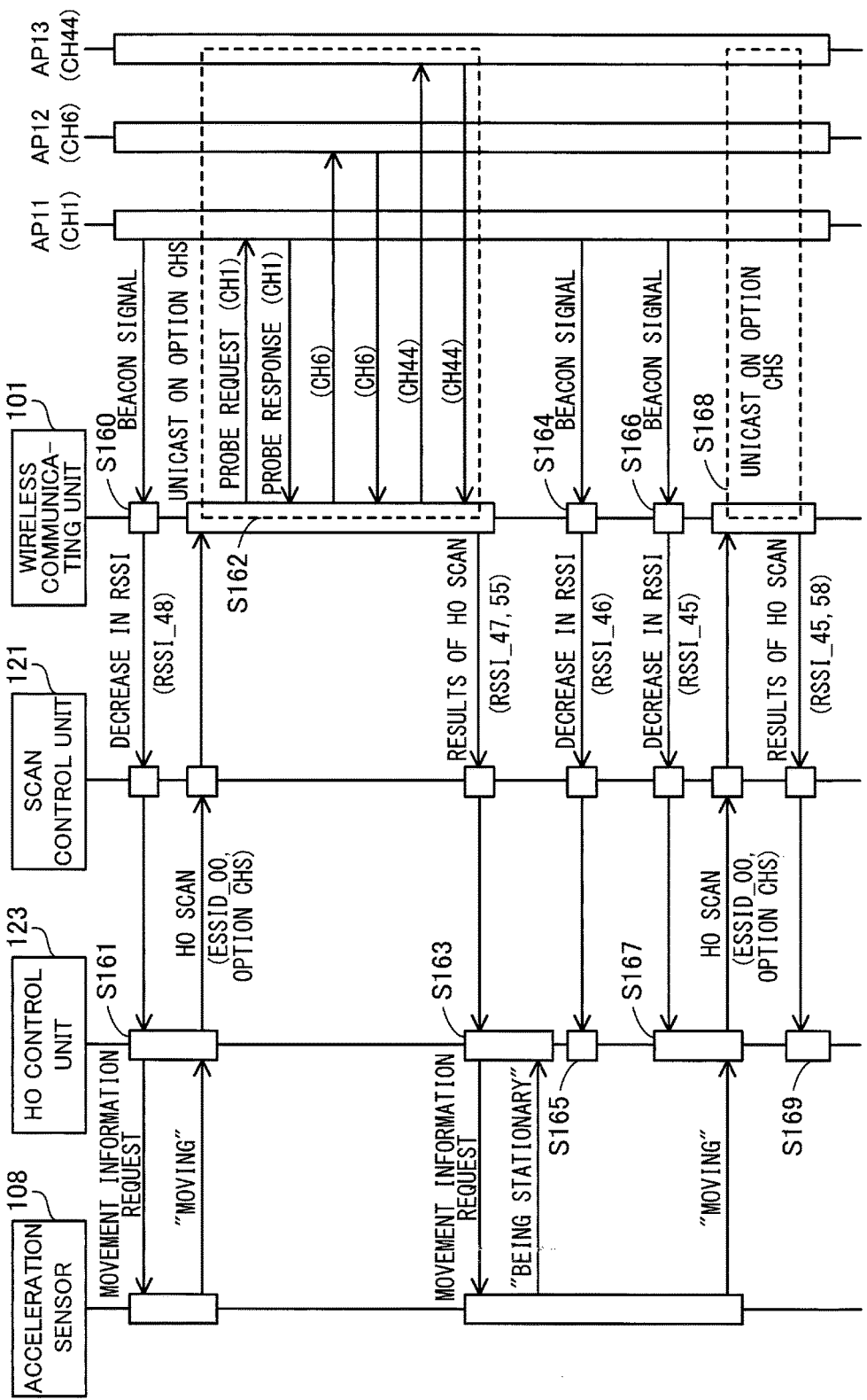
FIG. 27 is a sequence diagram illustrating a flow example of stopping a handover scan.

FIG. 27 is a sequence diagram illustrating a flow example of stopping a handover scan. Assume here that the mobile communication device 100 moved while being connected to the access point 11 and, then, came to a stop between the access points 11 and 12. The wireless communicating unit 101 receives a beacon signal from the access point 11 and measures the RSSI. Note here that the RSSI of the access point 11 is RSSI_48. The wireless communicating unit 101 detects that the RSSI is below the "handover scan" threshold and notifies the scan control unit 121 of a decrease in the RSSI (S160).

The scan control unit 121 notifies the handover control unit 123 of the decrease in the RSSI. The handover control unit 123 notifies the acceleration sensor 108 of a request for movement information. Assume here that the handover control unit 123 acquires, from the acceleration sensor 108, notice of "moving" as the movement state of the mobile communication device 100. Then, the handover control unit 123 searches the option channel table 113 for the option channels and outdoor flag corresponding to the access point 11. Subsequently, the handover control unit 123 gives the scan control unit 121 notice of a handover scan (S161).

The scan control unit 121 gives the wireless communicating unit 101 notice of the handover scan. The wireless communicating unit 101 runs a scan, limiting the search only to the option channels and access points with the designated ESSID. The wireless communicating unit 101 receives a probe response from the access point 11 on the channel CH1; a probe response from the access point 12 on the channel CH6; and a probe response from the access point 13 on the channel CH44 (S162).

Assume here that the RSSI of the access point 11 is RSSI_47, the RSSI of the access point 12 is RSSI_55, and the RSSI of the access point 13 is RSSI_25. The wireless communicating unit 101 extracts the access points 11 and 12 each of whose RSSI is equal to or greater than the "detection 1" threshold and notifies the scan control unit 121 of the results of the handover scan.

The scan control unit 121 notifies the handover control unit 123 of the results of the handover scan. The handover control unit 123 confirms that the RSSI of the access point 12 is equal to or greater than the "connection" threshold. On the other hand, the handover control unit 123 calculates the difference between the maximum RSSI, RSSI_55, and RSSI_47 of the access point 11, and confirms that the RSSI difference is below the "handover start" threshold. Then, the handover control unit 123 again notifies the acceleration sensor 108 of a request for movement information. Assume here that the handover control unit 123 acquires, from the acceleration sensor 108, notice of "being stationary" as the movement state of the mobile communication device 100. Then, the handover control unit 123 determines not to run a handover scan (S163).

The wireless communicating unit 101 again receives a beacon signal sent from the access point 11 and measures the RSSI. Assume here that the RSSI of the access point 11 is RSSI_46. The wireless communicating unit 101 detects that the RSSI is below the "handover scan" threshold and notifies the scan control unit 121 of a decrease in the RSSI (S164). The scan control unit 121 notifies the handover control unit 123 of the decrease in the RSSI. However, because no notice of "moving" is yet given, the handover control unit 123 determines not to run a handover scan (S165).

The wireless communicating unit 101 again receives a beacon signal sent from the access point 11 and measures the RSSI. Assume here that the RSSI of the access point 11 is RSSI_45. The wireless communicating unit 101 detects that the RSSI is below the "handover scan" threshold and notifies the scan control unit 121 of a decrease in the RSSI (S166). The scan control unit 121 notifies the handover control unit 123 of the decrease in the RSSI. Assume here that the movement of the mobile communication device 100 is detected and the acceleration sensor 108 notifies the handover control unit 123 of "moving". Then, the handover control unit 123 gives the scan control unit 121 notice of a handover scan (S167).

The scan control unit 121 gives the wireless communicating unit 101 notice of the handover scan. The wireless communicating unit 101 runs a scan by setting limitations on channels to be scanned and an ESSID to be detected, as in step S162 (S168). Assume here that the RSSI of the access point 11 is RSSI_45, the RSSI of the access point 12 is RSSI_58, and the RSSI of the access point 13 is RSSI 25. The wireless communicating unit 101 extracts the access points 11 and 12 each of whose RSSI is equal to or greater than the "detection 1" threshold and notifies the scan control unit 121 of the results of the handover scan.

The scan control unit 121 notifies the handover control unit 123 of the results of the handover scan. The handover control unit 123 confirms that the RSSI of the access point 12 is equal to or greater than the "connection" threshold. In addition, the handover control unit 123 calculates the difference between the maximum RSSI, RSSI_58, and RSSI_45 of the currently connected access point 11, and confirms that the RSSI difference is equal to or greater than the "handover start" threshold. Therefore, the handover control unit 123 determines that a handover is possible (S169). Herewith, a handover is performed. That is, the mobile communication device 100 is disconnected from the access point 11 and connected to the access point 12.

According to FIG. 27, a handover scan is held back from being run when the mobile communication device 100 is stationary; however, the cycle of a handover scan may be set longer instead.

Figure 28:
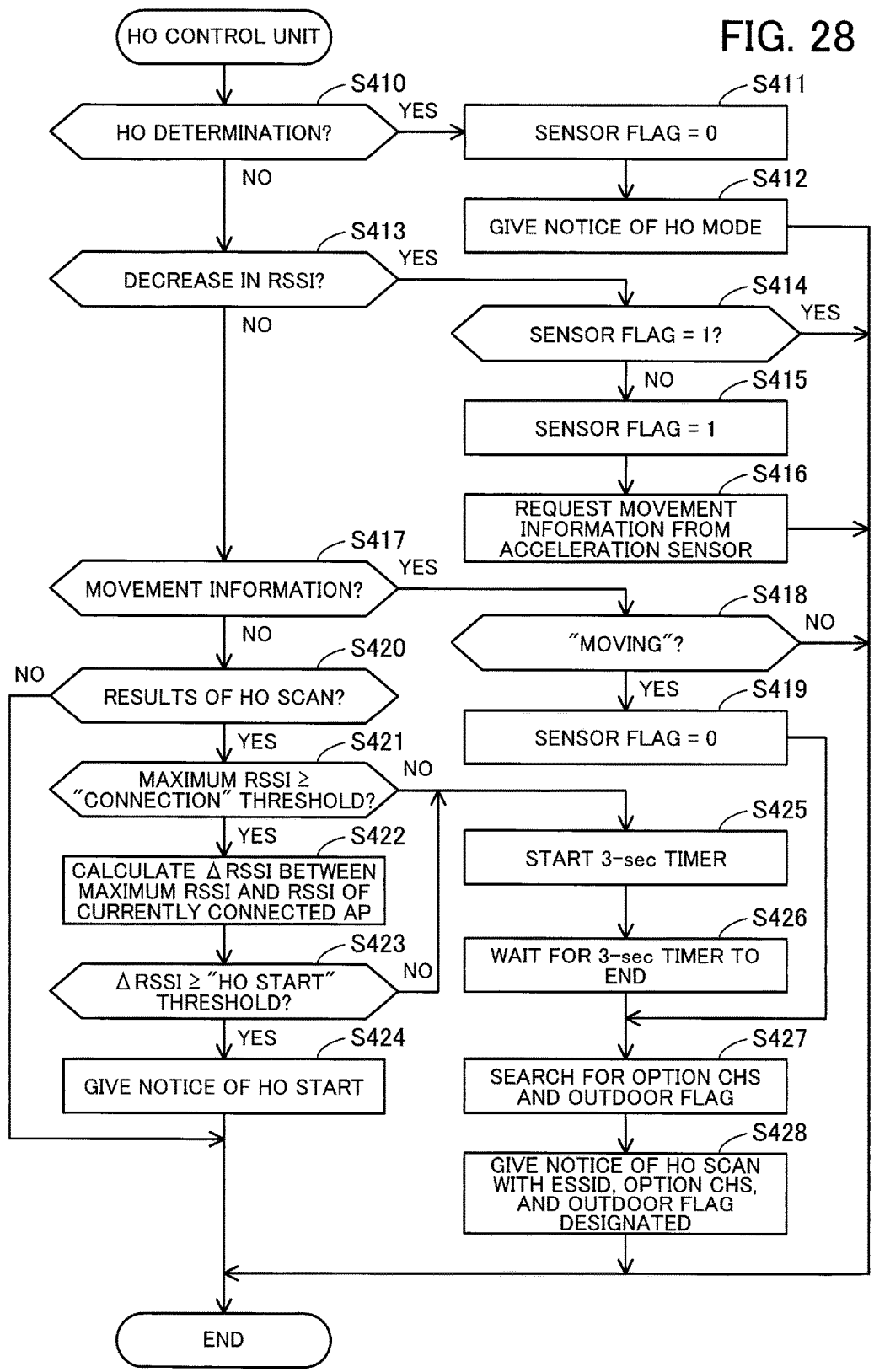
FIG. 28 is a flowchart illustrating a second procedure example of the handover control unit.

FIG. 28 is a flowchart illustrating a second procedure example of the handover control unit. Next described is an example of holding back from running a handover scan when the mobile communication device 100 is stationary.

(S410) The handover control unit 123 receives notice from the scan control unit 121, the access point managing unit 122, or the acceleration sensor 108. The handover control unit 123 determines whether the received notice is notice of handover determination sent from the access point managing unit 122. If it is handover determination notice, the procedure moves to step S411. If not, the procedure moves to step S413.

(S411) The handover control unit 123 sets a sensor flag to 0.

(S412) The handover control unit 123 gives the wireless communicating unit 101 notice of a handover mode. Then, the procedure of the handover control unit 123 ends.

(S413) The handover control unit 123 determines whether the received notice is notice of a decrease in the RSSI sent from the scan control unit 121. If it is RSSI decrease notice, the procedure moves to step S414. If not, the procedure moves to step S417.

(S414) The handover control unit 123 determines whether the sensor flag is set to 1. If the sensor flag is set to 1, the procedure of the handover control unit 123 ends. If the sensor flag is set to 0, the procedure moves to step S415. The sensor flag indicates whether movement information is being requested of the acceleration sensor 108. The sensor flag is set to 0 in step S411 above or step S419 to be described below and set to 1 in step S415 to be described below.

(S415) The handover control unit 123 sets the sensor flag to 1.

(S416) The handover control unit 123 notifies the acceleration sensor 108 of a request for movement information. Then, the procedure of the handover control unit 123 ends.

(S417) The handover control unit 123 determines whether the received notice is notice of movement information sent from the acceleration sensor 108. The movement information indicates the state of the mobile communication device 100, either "moving" or "being stationary". If it is notice of movement information, the procedure moves to step S418. If not, the procedure moves to step S420.

(S418) The handover control unit 123 determines whether the movement information sent from the acceleration sensor 108 indicates "moving". If it indicates "moving", the procedure moves to step S419. If it indicates "being stationary", the procedure of the handover control unit 123 ends.

(S419) The handover control unit 123 sets the sensor flag to 0.

(S420) The handover control unit 123 determines whether the received notice is notice of handover scan results sent from the scan control unit 121. If it is notice of handover scan results, the procedure moves to step S421. If not, the procedure of the handover control unit 123 ends.

(S421) The handover control unit 123 extracts the highest RSSI (maximum RSSI) amongst RSSIs included in the handover scan results. The handover control unit 123 determines whether the maximum RSSI is equal to or greater than the "connection" threshold. If it is equal to or greater than the "connection" threshold, the procedure moves to step S422. If not, the procedure moves to step S425.

(S422) The handover control unit 123 calculates the difference (ΔRSSI) between the maximum RSSI and the RSSI of a currently connected access point included in the handover scan results.

(S423) The handover control unit 123 determines whether ΔRSSI calculated in step S422 is equal to or greater than the "handover start" threshold. If it is equal to or greater than the "handover start" threshold, the procedure moves to step S424. If it is below the "handover start" threshold, the procedure moves to step S425.

(S424) The handover control unit 123 gives the wireless communicating unit 101 notice of a handover start. Then, the procedure of the handover control unit 123 ends.

(S425) The handover control unit 123 starts a 3-second timer.

(S426) The handover control unit 123 waits for the 3-second timer to end.

(S427) The handover control unit 123 searches the option channel table 113 for one or more option channels and the outdoor flag corresponding to the currently connected access point.

(S428) The handover control unit 123 gives the scan control unit 121 notice of a handover scan. In this regard, the handover control unit 123 designates the ESSID of the currently connected access point, and the option channels and outdoor flag found in step S427. Note that the option channels designated in the handover scan include the channel on which the currently connected access point operates.

Figure 29:
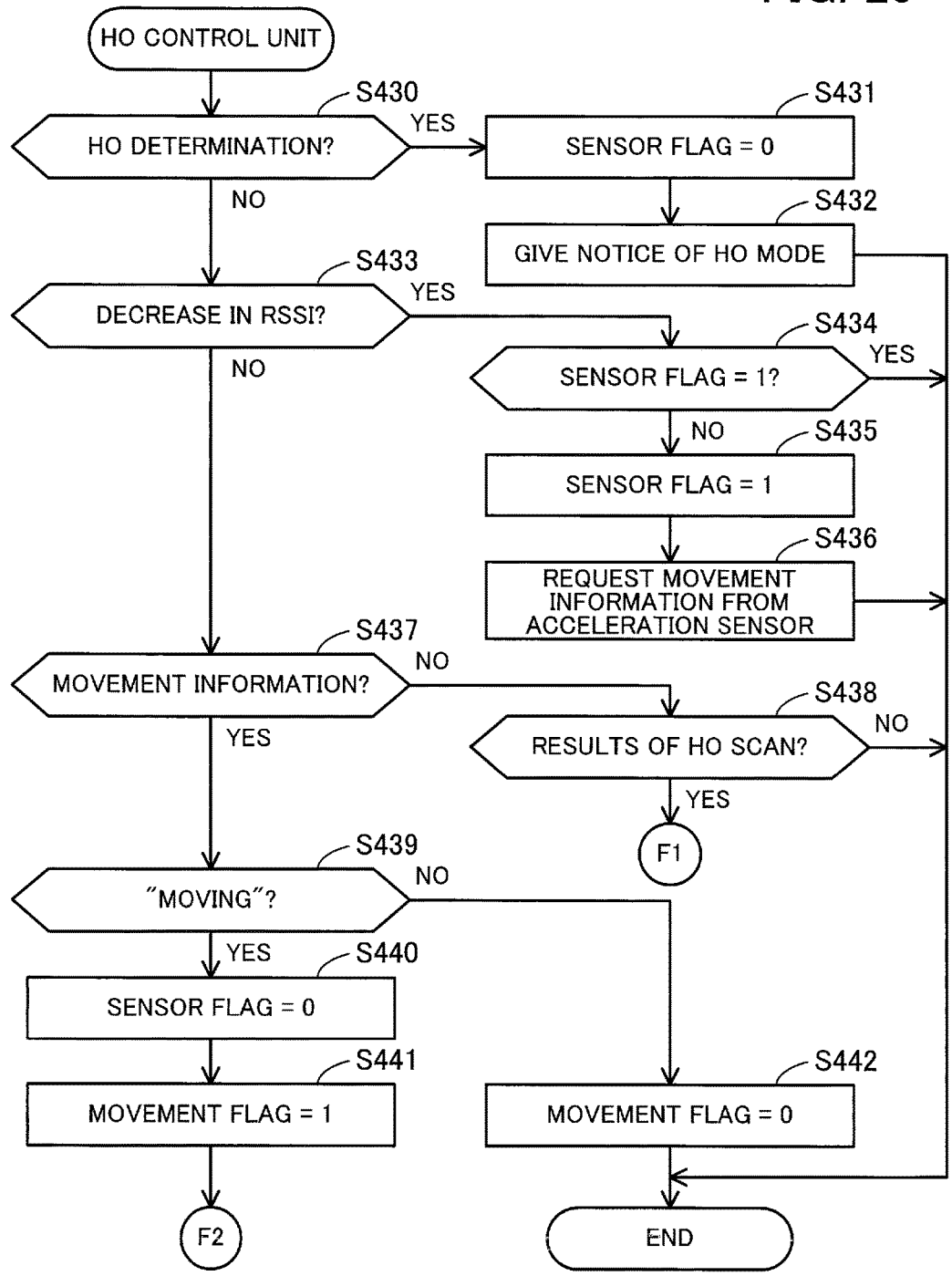
FIG. 29 is a flowchart illustrating a third procedure example of the handover control unit.

FIG. 29 is a flowchart illustrating a third procedure example of the handover control unit. Next described is an example of setting the cycle of a handover scan longer when the mobile communication device 100 is stationary. Note that steps S430 to S436 of FIG. 29 are the same as steps S410 to S416 of FIG. 28, and the repeated explanations are omitted here.

(S437) The handover control unit 123 determines whether the received notice is notice of movement information sent from the acceleration sensor 108. If it is notice of movement information, the procedure moves to step S439. If not, the procedure moves to step S438.

(S438) The handover control unit 123 determines whether the received notice is notice of handover scan results sent from the scan control unit 121. If it is notice of handover scan results, the procedure moves to step S443. If not, the procedure of the handover control unit 123 ends.

(S439) The handover control unit 123 determines whether the movement information sent from the acceleration sensor 108 indicates "moving". If it indicates "moving", the procedure moves to step S440. If it indicates "being stationary", the procedure moves to step S442.

(S440) The handover control unit 123 sets the sensor flag to 0.

(S441) The handover control unit 123 sets a movement flag to 1. Then, the procedure moves to step S451.

(S442) The handover control unit 123 sets the movement flag to 0. Then, the procedure of the handover control unit 123 ends.

Figure 30:
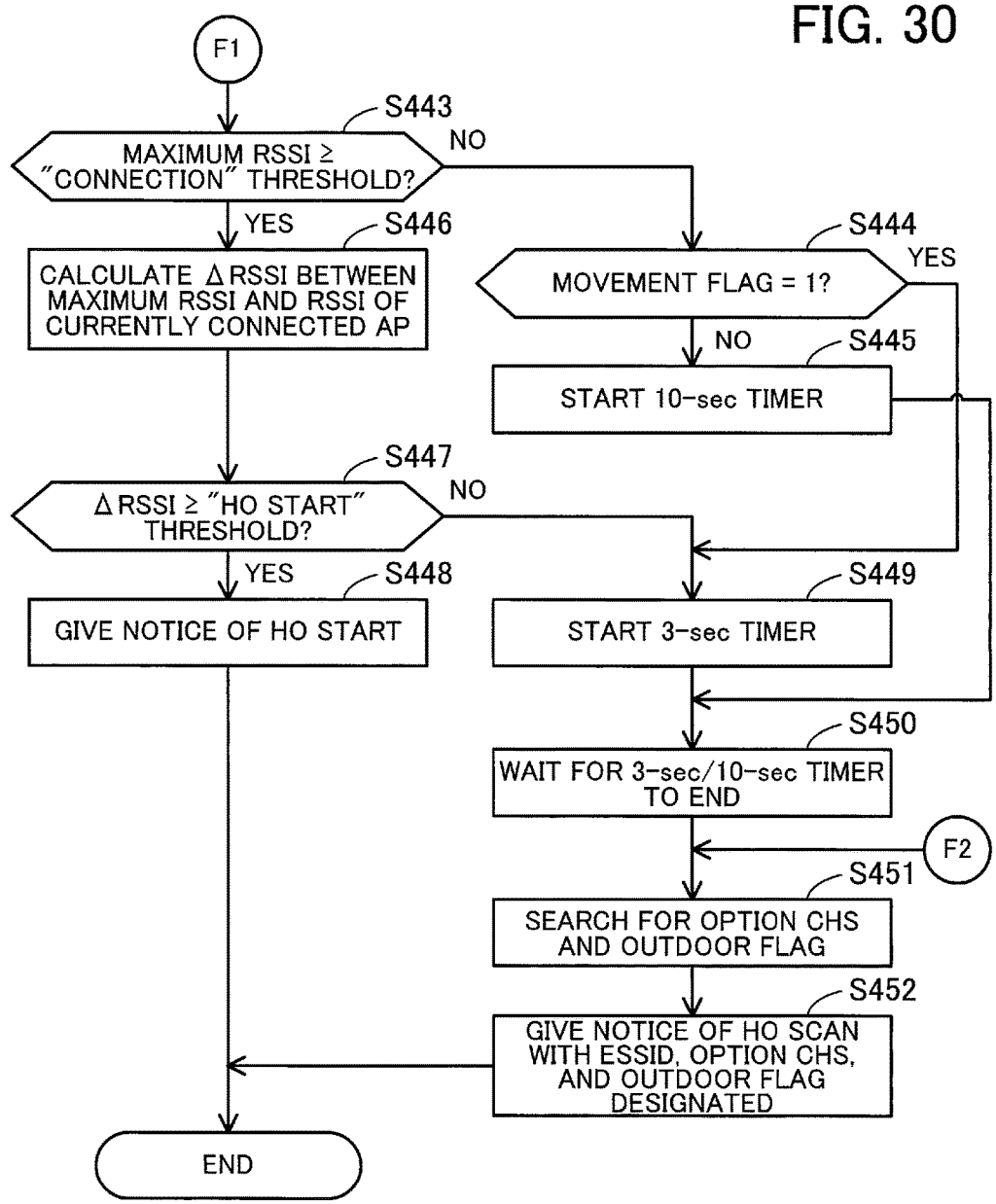
FIG. 30 is a flowchart illustrating the third procedure example of the handover control unit, continued from FIG. 29.

FIG. 30 is a flowchart illustrating the third procedure example of the handover control unit, continued from FIG. 29.

(S443) The handover control unit 123 extracts the highest RSSI (maximum RSSI) amongst RSSIs included in the handover scan results. The handover control unit 123 determines whether the maximum RSSI is equal to or greater than the "connection" threshold. If it is equal to or greater than the "connection" threshold, the procedure moves to step S446. If not, the procedure moves to step S444.

(S444) The handover control unit 123 determines whether the movement flag is set to 1. If the movement flag is set to 1, the procedure moves to step S449. If the movement flag is set to 0, the procedure moves to step S445. The movement flag indicates whether the acceleration sensor 108 has detected the mobile communication device 100 "moving". The movement flag is set to 1 in step S441 above and set to 0 in step S442 above.

(S445) The handover control unit 123 starts a 10-second timer. Then, the procedure moves to step S450.

(S446) The handover control unit 123 calculates the difference (ΔRSSI) between the maximum RSSI and the RSSI of a currently connected access point included in the handover scan results.

(S447) The handover control unit 123 determines whether ΔRSSI calculated in step S446 is equal to or greater than the "handover start" threshold. If it is equal to or greater than the "handover start" threshold, the procedure moves to step S448. If it is below the "handover start" threshold, the procedure moves to step S449.

(S448) The handover control unit 123 gives the wireless communicating unit 101 notice of a handover start. Then, the procedure of the handover control unit 123 ends.

(S449) The handover control unit 123 starts a 3-second timer.

(S450) The handover control unit 123 waits for the 10-second timer started in step S445 or the 3-second timer started in step S449 to end.

(S451) The handover control unit 123 searches the option channel table 113 for one or more option channels and the outdoor flag corresponding to the currently connected access point.

(S452) The handover control unit 123 gives the scan control unit 121 notice of a handover scan. In this regard, the handover control unit 123 designates the ESSID of the currently connected access point, and the option channels and outdoor flag found in step S451. Note that the option channels designated in the handover scan include the channel on which the currently connected access point operates.

Figure 31:
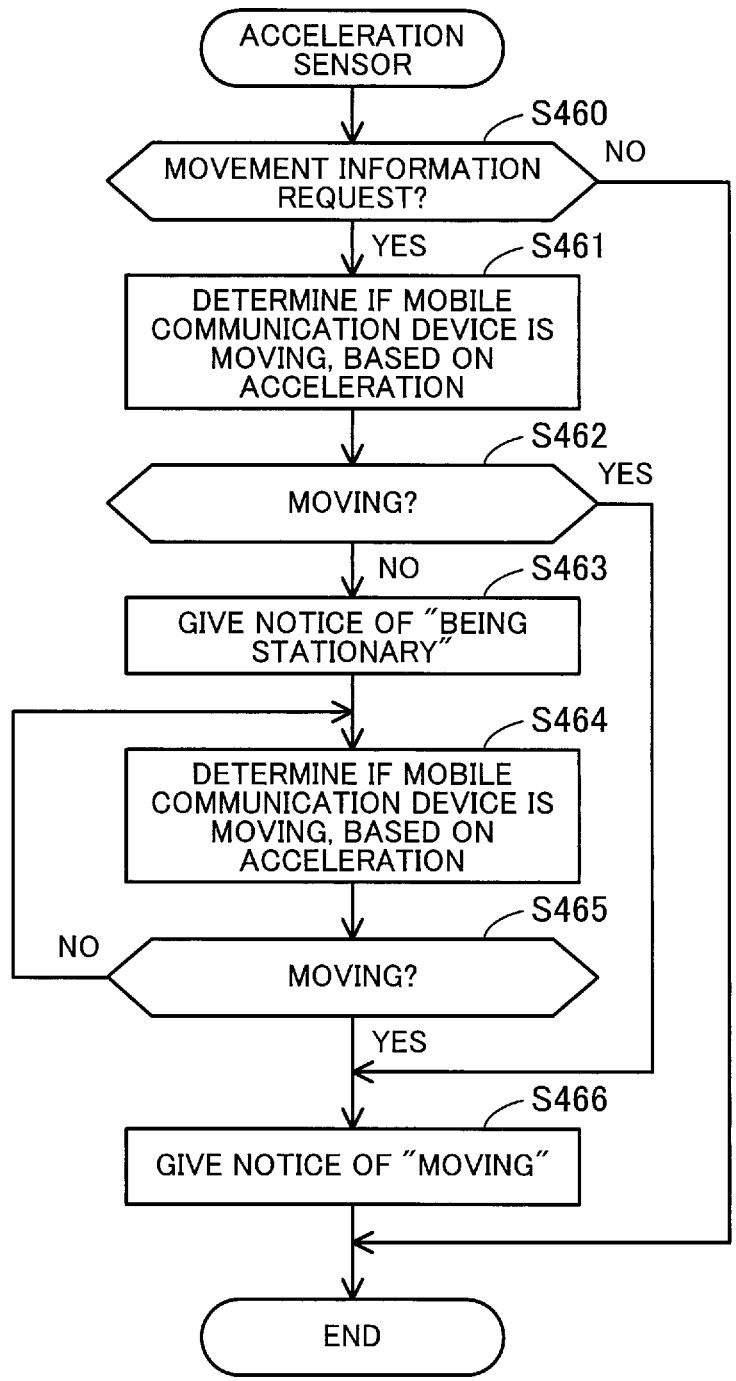
FIG. 31 is a flowchart illustrating a procedure example of an acceleration sensor.

FIG. 31 is a flowchart illustrating a procedure example of the acceleration sensor.

(S460) The acceleration sensor 108 determines whether to have received notice of a movement information request from the handover control unit 123. If the acceleration sensor 108 has received the notice, the procedure moves to step S461. If the acceleration sensor 108 has not received it, the procedure of the acceleration sensor 108 ends.

(S461) Based on the rate of acceleration that the acceleration sensor 108 measured, the acceleration sensor 108 determines whether the mobile communication device 100 is moving or stationary.

(S462) The acceleration sensor 108 determines whether the mobile communication device 100 was determined to be moving in step S461. If the mobile communication device 100 was determined to be moving, the procedure moves to step S466. If the mobile communication device 100 was determined to be stationary, the procedure moves to step S463.

(S463) The acceleration sensor 108 gives the handover control unit 123 notice of "being stationary".

(S464) Based on the rate of acceleration that the acceleration sensor 108 measured, the acceleration sensor 108 determines whether the mobile communication device 100 is moving or stationary, as in step S461.

(S465) The acceleration sensor 108 determines whether the mobile communication device 100 was determined to be moving in step S464. If the mobile communication device 100 was determined to be moving, the procedure moves to step S466. If the mobile communication device 100 was determined to be stationary, the procedure moves to step S464.

(S466) The acceleration sensor 108 gives the handover control unit 123 notice of "being moving".

Thus, upon receiving notice of a movement information request, the acceleration sensor 108 measures the movement state of the mobile communication device 100 at that point in time and gives a reply to the request. In addition, in the case where the mobile communication device 100 is stationary at the time of receiving the notice of a movement information request, the acceleration sensor 108 continuously measures the movement state until detecting movement of the mobile communication device 100. Then, when detecting movement of the mobile communication device 100, the acceleration sensor 108 gives notice accordingly.

The mobile communication system of the third embodiment achieves the same effect as the second embodiment. Further, the mobile communication system of the third embodiment reduces excessive handover scans in a situation where a different access point satisfying the handover condition is less likely to appear. For example, excess handover scans are reduced in a situation where no change is seen in the RSSI even though one or more different access points are detected. This situation is observed, for example, when the mobile communication device 100 becomes stationary around a wireless area where a handover is possible or at the boundary between wireless areas of two access points.

According to one aspect, it is possible to control excessive search for handover-destination access points.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more, embodiments of the present invention have been described in detail, it should be understood that various changes, substitutions, and alterations could be made hereto without departing from the spirit and scope of the invention.

What is claimed is:

1. A mobile communication device comprising:
a wireless communication interface configured to run a third scan for selecting a destination access point, and to run a first scan for searching for one or more other access points that have same identification information as the selected destination access point before establishing a connection to the destination access point, the third scan and the first scan being run when the mobile communication device is not connected to any access point; and
a processor configured to perform a procedure including:
determining whether the destination access point and the one or more other access points are detected on different channels, and altering, based on results of the determining, a method of a second scan to be run after establishing the connection to the destination access point.

2. The mobile communication device according to claim 1, wherein the procedure further includes causing, when the one or more other access points have been detected by the first scan, the second scan to be run by limiting search only to the one or more other access points with the same identification information.

3. The mobile communication device according to claim 1, further comprising:
a memory configured to store channel information indicating the different channels,
wherein, the procedure further includes:
causing, when the one or more other access points have been detected by the first scan, the second scan to be run preferentially on the different channels indicated by the channel information.

4. The mobile communication device according to claim 3, further comprising:
a display unit configured to switch display of a screen between on-state and off-state,
wherein, the procedure further includes:
causing, when the display unit is in the off-state after establishing the connection to the destination access point, the wireless communication interface to rerun the first scan and updating the channel information based on results of the rerun first scan.

5. The mobile communication device according to claim 1, wherein the procedure further includes interrupting, when the wireless communication interface runs the second scan on a plurality of channels while performing data communication, the second scan between a search on one channel and a search on a next channel to allow the data communication.

6. The mobile communication device according to claim 1, wherein the different channels include two or more channels in a 2.4 GHz band or a 5 GHz band.

7. The mobile communication device according to claim 1, wherein the determining includes determining whether the destination access point and two or more other access points with the same identification information have been detected on the different channels.

8. A mobile communication device comprising:
a wireless communication interface configured to run a first scan for searching for one or more access points; and
a processor configured to perform a procedure including:
determining whether, by the first scan, a plurality of access points with same identification information have been detected on different channels, and altering, based on results of the determining, a method of a second scan to be run after a connection to an access point, the procedure further includes:
causing, when the plurality of access points have been detected by the first scan, the wireless communication interface to initiate the second scan in response to a decrease in strength of a received signal transmitted from the connected access point to or below a second threshold, the second threshold being higher than a first threshold used to determine whether a connection to an access point is possible, and
controlling a handover from the connected access point to a different access point detected by the second scan.

9. A mobile communication device comprising:
a wireless communication interface configured to run a first scan for searching for one or more access points; and
a processor configured to perform a procedure including:
determining whether, by the first scan, a plurality of access points with same identification information have been detected on different channels, and altering, based on results of the determining, a method of a second scan to be run after a connection to an access point, and
determining whether the mobile communication device is moving and, when the mobile communication device is not moving, holding back from running the second scan or setting a cycle of the second scan longer than when the mobile communication device is moving.

10. A wireless communication method used by a mobile communication device, the wireless communication method comprising:
running a third scan for selecting a destination access point, and running a first scan for searching for one or more other access points that have same identification information as the selected destination access point before establishing a connection to the destination access point, the third scan and the first scan being run when the mobile communication device is not connected to any access point; and
determining whether the destination access point and the one or more other access points are detected on different channels, and altering, based on results of the determining, a method of a second scan to be run after establishing the connection to the destination access point.

11. A non-transitory computer-readable storage medium storing a computer program that causes a computer provided on a mobile communication device to perform a procedure comprising:
running a third scan for selecting a destination access point, and running a first scan for searching for one or more other access points that have same identification information as the selected destination access point before establishing a connection to the destination access point, the third scan and the first scan being run when the mobile communication device is not connected to any access point; and
determining whether the destination access point and the one or more other access points are detected on different channels, and altering, based on results of the determining, a method of a second scan to be run after establishing the connection to the destination access point.

* * * * *